US012372633B2

(12) United States Patent
Schmalzl

(10) Patent No.: US 12,372,633 B2
(45) Date of Patent: Jul. 29, 2025

(54) RADAR DATA COMPRESSION

(71) Applicant: Infineon Technologies AG, Neubiberg (DE)

(72) Inventor: Stefan Schmalzl, Sauerlach (DE)

(73) Assignee: Infineon Technologies AG, Neubiberg (DE)

( * ) Notice: Subject to any disclaimer, the term of this patent is extended or adjusted under 35 U.S.C. 154(b) by 381 days.

(21) Appl. No.: 18/158,631

(22) Filed: Jan. 24, 2023

(65) Prior Publication Data

US 2024/0248191 A1 Jul. 25, 2024

(51) Int. Cl.
| | |
|---|---|
| *G01S 13/28* | (2006.01) |
| *G01S 7/288* | (2006.01) |
| *G01S 7/40* | (2006.01) |
| *G01S 13/34* | (2006.01) |
| *G01S 13/931* | (2020.01) |

(52) U.S. Cl.
CPC ............ *G01S 13/28* (2013.01); *G01S 7/2883* (2021.05); *G01S 7/4008* (2013.01); *G01S 13/343* (2013.01); *G01S 13/931* (2013.01)

(58) Field of Classification Search
CPC ...... G01S 13/28; G01S 7/2883; G01S 7/4008; G01S 13/343; G01S 13/931; G01S 7/003; G01S 7/021; H03M 7/30
See application file for complete search history.

(56) References Cited

U.S. PATENT DOCUMENTS

2018/0062768 A1* 3/2018 Frank .................... H04B 15/005
2020/0150220 A1* 5/2020 Maor ....................... G01S 7/038

* cited by examiner

*Primary Examiner* — Vladimir Magloire
*Assistant Examiner* — Bongani Jabulani Mashele
(74) *Attorney, Agent, or Firm* — Harrity & Harrity, LLP

(57) ABSTRACT

A radar monolithic microwave integrated circuit includes a radio frequency (RF) input configured to receive an RF signal comprising a plurality of frequency ramps; a baseband processing circuit configured to convert the RF signal into a baseband signal comprising a plurality of analog signal segments each corresponding to a different frequency ramp; an analog-to-digital converter configured to convert the plurality of analog signal segments into a plurality of respective digital signal segments, wherein each digital signal segment of the plurality of respective digital signal segments comprises a plurality of digital samples corresponding to a respective analog signal segment; and an encoder configured to receive a single digital signal segment and compress the plurality of digital samples of the single digital signal segment based on a data compression that has a defined correlation with a windowing function to generate compressed radar data corresponding to the single digital signal segment.

19 Claims, 9 Drawing Sheets

RADAR DATA COMPRESSION

BACKGROUND

Radar sensors are used in a number of applications to detect objects, where the detection typically comprises measuring distances, velocities, or angles of arrival associated with detected targets. In particular, in the automotive sector, there is an increasing need for radar sensors that are able to be used in, for example, driving assistance systems (e.g., advanced driver assistance systems (ADAS)), such as for example in adaptive cruise control (ACC) or radar cruise control systems. Such systems are automatically able to adjust the speed of a motor vehicle in order to maintain a safe distance from other motor vehicles traveling in front of the motor vehicle (and from other objects and pedestrians). Other example applications of a radar sensor in the automotive sector include blind spot detection, lane change assist, and the like.

SUMMARY

In some implementations, a radar monolithic microwave integrated circuit (MMIC) includes a radio frequency (RF) input configured to receive an RF signal comprising a plurality of frequency ramps; a baseband processing circuit configured to convert the RF signal into a baseband signal comprising a plurality of analog signal segments, wherein each analog signal segment of the plurality of analog signal segments corresponds to a different frequency ramp of the plurality of frequency ramps; an analog-to-digital converter (ADC) configured to convert the plurality of analog signal segments into a plurality of respective digital signal segments, wherein each digital signal segment of the plurality of respective digital signal segments comprises a plurality of digital samples corresponding to a respective analog signal segment; an encoder configured to receive a single digital signal segment of the plurality of respective digital signal segments and compress the plurality of digital samples of the single digital signal segment based on a data compression that has a defined correlation with a windowing function to generate compressed radar data corresponding to the single digital signal segment; and a data transmission interface configured to transmit the compressed radar data.

In some implementations, a data transmission method includes receiving, by a radar MMIC, an RF signal comprising a plurality of frequency ramps; converting, by the radar MMIC, the RF signal into a baseband signal comprising a plurality of analog signal segments, wherein each analog signal segment of the plurality of analog signal segments corresponds to a different frequency ramp of the plurality of frequency ramps; converting, by the radar MMIC, the plurality of analog signal segments into a plurality of respective digital signal segments, respectively, wherein each digital signal segment of the plurality of respective digital signal segments comprises a first plurality of digital samples corresponding to a respective analog signal segment; encoding, by the radar MMIC, a single digital signal segment of the plurality of respective digital signal segments, including compressing the first plurality of digital samples of the single digital signal segment based on a data compression that has a defined correlation with a windowing function to generate compressed radar data corresponding to the single digital signal segment; transmitting, by the radar MMIC, the compressed radar data; and decoding, by a radar system controller, the compressed radar data, including decompressing the compressed radar data based on a data decompression that has the defined correlation with the windowing function to generate a second plurality of digital samples that are representative of the first plurality of digital samples.

In some implementations, a radar system controller includes a data transmission interface configured to receive compressed radar data comprising a first plurality of digital words having a first plurality of word lengths; and a decoder configured to decompress the first plurality of digital words by applying a dynamic word length expansion to the first plurality of digital words according to a defined correlation with a windowing function to generate a second plurality of digital words, wherein each digital word of the second plurality of digital words has a same number of bits corresponding to an expanded word length.

BRIEF DESCRIPTION OF THE DRAWINGS

Implementations are described herein making reference to the appended drawings.

DETAILED DESCRIPTION

Figure 1:
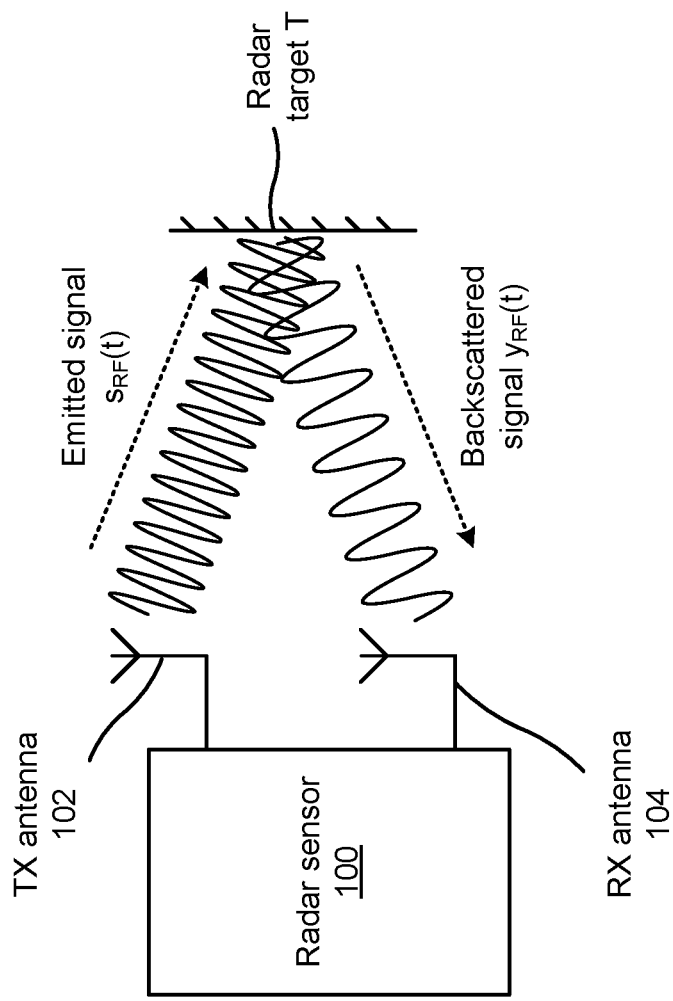
FIG. 1 is a diagram of an example application of a frequency-modulated continuous-wave (FMCW) radar sensor.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

Each of the illustrated x-axis, y-axis, and z-axis is substantially perpendicular to the other two axes. In other words, the x-axis is substantially perpendicular to the y-axis and the z-axis, the y-axis is substantially perpendicular to the x-axis and the z-axis, and the z-axis is substantially perpendicular to the x-axis and the y-axis. In some cases, a single reference number is shown to refer to a surface, or fewer than all instances of a part may be labeled with all surfaces of that part. All instances of the part may include associated surfaces of that part despite not every surface being labeled.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A radar monolithic microwave integrated circuit (MMIC), sometimes referred to as single radar chip, may incorporate all core functions of an RF frontend of a radar transceiver (e.g., local oscillator, power amplifiers, low-noise amplifiers (LNAs), mixers, etc.), analog preprocessing of the intermediate frequency (IF) or base band signals (e.g., filters, amplifiers, etc.), and analog-to-digital conversion in one single package. The RF frontend usually includes multiple reception (RX) and transmission (TX) channels, particularly in applications in which beam steering techniques, phased antenna arrays, etc. are used. In radar applications, phased antenna arrays may be employed to sense the incidence angle of incoming RF radar signals (also referred to as "Direction of Arrival" or DOA).

In the context of radar MMICs, so-called "cascaded systems" have emerged, whereby multiple MMICs are interconnected to embody a single overall system with increased resolution for radar targets discrimination. In a Multiple-Input Multiple-Output (MIMO) system, a local oscillator source distributes an RF signal to the transmission and reception channels of each radar MMIC. Additionally, for advanced MIMO and reconfigurable radars it may be useful to have a high number of transmitter outputs on a radar chip, with each transmitter output coupled to a different antenna.

For some applications, the phase relationship between channels, both from an inter-chip and intra-chip perspective, is important. A phase difference between transmission channels can drift or become unbalanced, for example, due to temperature changes. This parameter is called phase drift, and ensuring low phase drift can be technically challenging. Transmission signal monitoring can be used to measure the phase of each inter-chip and/or intra-chip TX channel, and phase shifters can be used to calibrate each transmission channel based on the result to minimize the phase drift (so called phase balancing).

Additionally, reception signal monitoring is an operation that may be executed by a radar MMIC to ensure that all units involved in reception of radar signal are working as expected and the received radar data can be trusted for use. In particular, a monitoring subsystem can be used to observe key parameters and performance or health indicators, by means of specific measurements carried out on special test signals, which can highlight faults in the system so that appropriate action can be taken in such occurrences. One common circumstance in which the monitoring subsystem can become ineffective is the presence of interference during the monitoring measurement (e.g., during injection of the monitoring signal or test signal into an RX channel). In such case, interference may impact the result of the monitoring and be treated as a fault. This may result in part or the entire system being shut down, despite the possible interference being only a temporary event.

A radar MMIC may transmit radar data to an external device, such as a microcontroller, for further processing. For example, the external device may apply various signal processing techniques to perform Doppler analysis, including applying fast Fourier transform (FFT) algorithms to generate a range-FFT and a Doppler-FFT for object detection and for distance, velocity, and angle of arrival measurements associated with detected objects. However, the radar MMIC may generate large amounts of radar data (e.g., raw data) and transmission interfaces are often limited in bandwidth. In addition, larger amounts of data typically require longer transmission times, which can impede an ability of the external device from detecting objects more quickly, as the external device will have to wait longer to receive all requisite data for object detection. Quick object detection may be especially important in safety-relevant applications, such as in driving assistance systems. In addition, larger amounts of data typically require higher amounts of energy through, for example, longer transmission times, higher transmission speeds, and/or more transmission channels. In addition, more transmission channels typically require larger chip and printed circuit board (PCB) space, resulting in higher manufacturing costs.

Some implementations disclosed herein are directed to a radar system that uses efficient data transmission between a radar MMIC and an external device, such as a microcontroller. For example, some implementations disclosed herein are directed to lossless data compression for generating compressed radar data for transmission. Alternatively, some implementations disclosed herein are directed to lossy (e.g., low loss) data compression for generating compressed radar data for transmission. The radar MMIC may be configured to compress or otherwise encode radar data to generate compressed radar data, and transmit the compressed radar data to the external device via a data transmission interface.

In some implementations, the radar MMIC may include an encoder that is configured compress radar data based on a data compression that has a defined correlation with a windowing function (sometimes referred to as a "window function") to generate compressed radar data corresponding to the radar data. As defined herein, a data compression that has a defined correlation with a windowing function is equivalent to a non-uniform compression factor. For example, the defined correlation with the windowing function may be a curve comprising at least an ascending portion and a descending portion. Accordingly, the encoder may be configured to compress the radar data according to the curve. As a result, the data compression may be referred to as an inhomogeneous data compression and the data compression for each data sample depends on a location of the data sample within a signal section (e.g., signal segment) that is windowed. For example, with a curved windowing function, data samples at and close to the beginning and the end of the signal section may be compressed with a higher compression factor than data samples in the center of the signal section. For example, the encoder may be configured to apply the inhomogeneous data compression to the radar data, such that an amount of compression applied to the radar data varies in a time domain according to the defined correlation with the windowing function. This results in a signal section in which the data samples in a specified signal section are compressed with different compression factors.

For example, a windowing function may be a mathematical function, and the windowing function may be representative of a curve of scaling factors according to the mathematical function. In some implementations, the mathematical function may be zero-valued (e.g., a zero scaling factor) outside of a predetermined interval. The mathematical function may have a maximum value (e.g., a scaling factor of 1) at or near a center of the predetermined interval and the mathematical function may have tapered sides that, for example, taper away from the center of the predetermined interval towards zero. Mathematically, when another function, waveform, or data-sequence is multiplied by the windowing function, the product is also zero-valued outside the predetermined interval and data inside the predetermined interval is scaled by the curve of scaling factors.

Examples of a windowing function include a Hamming window and a Chebyshev window, but implementations described herein are not limited thereto. For example, in some implementations, the windowing function may be symmetric about the center of the predetermined interval. In some implementations, the windowing function may be asymmetric about the center of the predetermined interval.

The inhomogeneous data compression applied by the encoder based on the windowing function results in lossless or low loss data compression that can improve data throughput from the radar MMIC to the external device.

The inhomogeneous data compression applied by the encoder based on the windowing function may lead to faster object detection in radar applications.

The inhomogeneous data compression applied by the encoder based on the windowing function may cause a reduction in energy consumed or otherwise used for the data transmission, due to, for example, shorter transmission times, lower transmission speeds, and/or less transmission channels. Thus, the radar MMIC or the radar system as a whole may become more energy efficient.

The inhomogeneous data compression applied by the encoder based on the windowing function may reduce chip space and/or PCB space as a result of the ability to use fewer components and/or smaller components for the data transmission, resulting in lower manufacturing costs.

FIG. 1 is a diagram illustrating an example application of a frequency-modulated continuous-wave (FMCW) radar sensor in the form of a radar sensor 100 for measuring distances, velocities, or angle of arrivals (AoAs) associated with objects, referred to as targets. As shown in FIG. 1, the radar sensor 100 may have one or more TX antennas 102 and one or more RX antennas 104. In some implementations, a single antenna may be used that serves simultaneously as a TX antenna 102 and as an RX antenna 104.

In operation, the TX antenna 102 continuously emits a radio frequency (RF) signal $s_{RF}(t)$ (also referred to as a transmitted radar signal), which is frequency-modulated, for example, by a periodic linear frequency ramp signal (also referred to as frequency sweep or chirp signal). The transmitted radar signal $s_{RF}(t)$ is backscattered at a target T and a reflected signal $y_{RF}(t)$ (e.g., a back-scattered signal, an echo signal, a received RF signal, or a received radar signal) is received by the RX antenna 104. FIG. 1 shows a simplified example—in practice, the radar sensor 100 may include a plurality of TX antennas 102 and RX antennas 104 to be able to determine an AoA of the received RF signal $y_{RF}(t)$ and, therefore, locate the target T with increased accuracy.

It will be appreciated that "(t)" denotes an analog signal defined as a continuous wave that may change over a time period t, and "[n]" denotes a digital signal defined as a discrete wave, where n is an integer and may represent an nth digital sample or a digital signal containing n digital samples. A signal may be represented with or without its analog or digital domain identifier (t) and [n], respectively. It will be further appreciated that RF circuits, such as the radar sensor 100, may be used in fields other than radar. For example, RF circuits may be used in RF communication systems. Accordingly, in some implementations, the radar sensor 100 may be used in RF applications other than radar, such as RF communications.

As indicated above, FIG. 1 is provided as an example. Other examples may differ from what is described with regard to FIG. 1.

Figure 2:
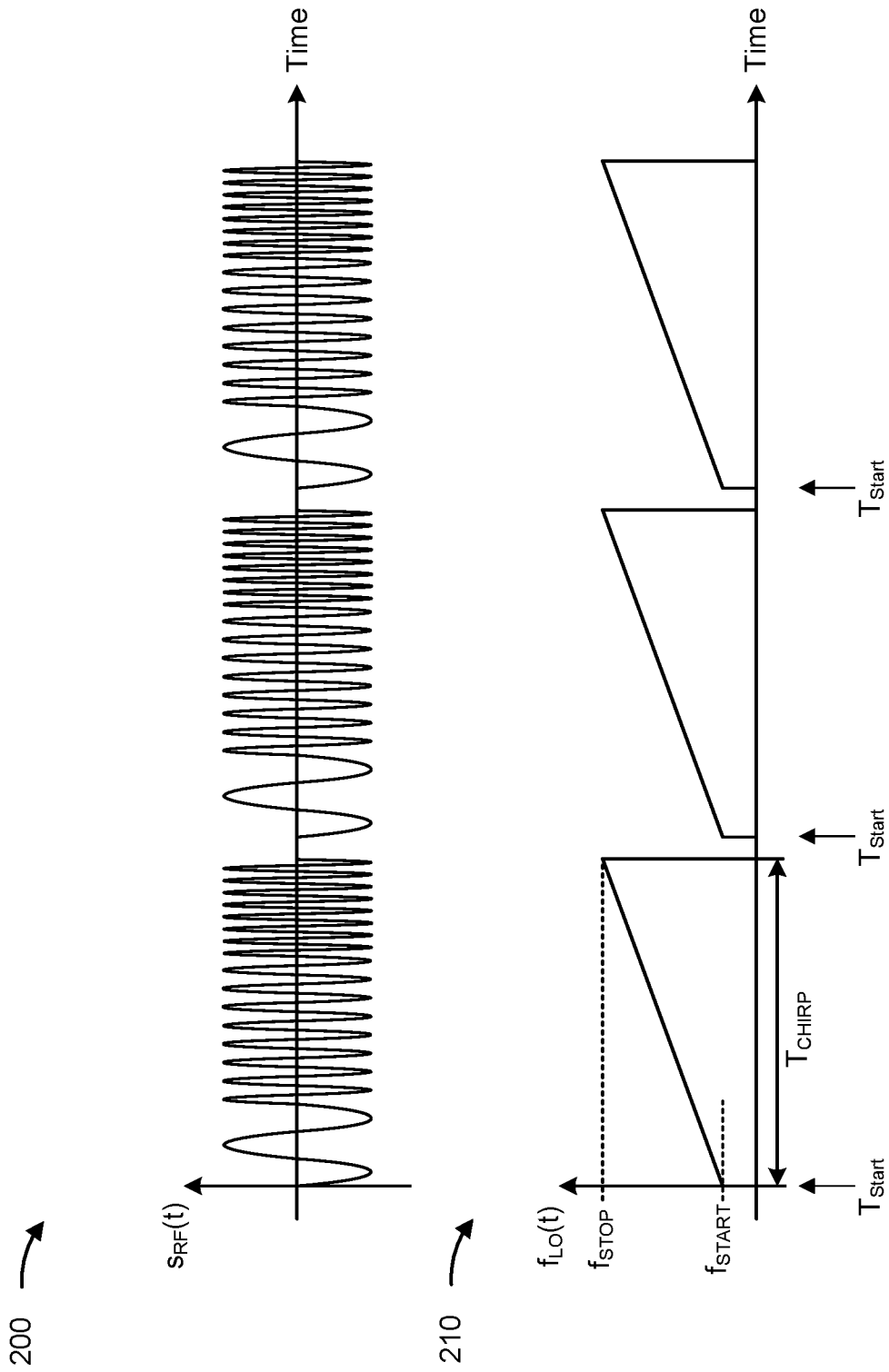
FIG. 2 illustrates an example of frequency modulation of a transmitted radar signal transmitted by the FMCW radar sensor.

FIG. 2 illustrates an example of the frequency modulation of the RF signal $s_{RF}(t)$. As illustrated in an upper diagram 200 of FIG. 2, the RF signal $s_{RF}(t)$ comprises a plurality of frequency ramps or series of "chirps"; that is to say the $s_{RF}(t)$ signal comprises a sequence of sinusoidal signal profiles (i.e., waveforms) with a rising frequency (referred to as an up-chirp) or a falling frequency (referred to as a down-chirp). In the example shown in FIG. 2, the instantaneous frequency $f_{LO}(t)$ of a chirp increases linearly, starting at a start frequency $f_{START}$, to a stop frequency $f_{STOP}$ within a time interval $T_{CHIRP}$, as shown in a lower diagram 210 of FIG. 2. Such chirps are also referred to as linear frequency ramps. For a measurement, a sequence of frequency ramps is emitted, and a resulting echo signal is evaluated in baseband to detect one or more radar targets.

A frequency-modulated ramp signal, such as local oscillator signal used for generating a radar signal, may include a plurality of radar frames which may also be referred to as radar operation cycles or chirp frames. A sequence of ramps may make up each a radar frame. For example, a radar operation cycle may include several hundreds of radar ramps (sweeps) taking up to 10-30 milliseconds (ms) in total. A frame length of the radar frame may correspond to one radar operation cycle. It is also to be noted that consecutive ramps may have a short pause therebetween and a longer pause may be used between consecutive radar frames. The longer pause between consecutive radar frames may be referred to as a configuration interval during which one or more ramp parameters of the RF signal can be adjusted for subsequent radar frames. A ramp start time $T_{START}$ indicates a start time for each chirp and may occur at a predetermined interval according to, for example, a number of clock cycles.

It will be appreciated that the start frequency $f_{START}$ and stop frequency $f_{STOP}$ of the ramps may be within a frequency band with minimum frequency Fmin and maximum frequency Fmax. As such, the minimum frequency Fmin and the maximum frequency Fmax define an operating frequency range or a frequency band usable for the ramping signals, and thus, the frequency range or the frequency band of the radar application of a radar MMIC. In some embodiments, the frequency range defined by a single ramp having start and stop frequencies $f_{START}$ and $f_{STOP}$ may be smaller than the usable radar frequency band. However, all ramps that are generated during operation may lie between the frequencies Fmin and Fmax of the radar frequency band (e.g., between 76-81 GHz) used for generating the ramping signals.

FIG. 2 illustrates three identical linear frequency ramps or chirps. It is noted, however, that the parameters $f_{START}$, $f_{STOP}$, $T_{CHIRP}$ and/or the pause between the individual frequency ramps may vary dependent on the actual implementation and use of the radar sensor 100. In practice, the frequency variation may be, for example, linear (linear ramp, frequency ramp), exponential (exponential ramp), or hyperbolic (hyperbolic ramp). In some implementations, the frequency may decrease instead of increase during time interval $T_{CHIRP}$. Furthermore, in some implementations, a center frequency of each ramp (and therefore $f_{START}$ and $f_{STOP}$) may vary (e.g., from ramp to ramp or after detecting an interference) to allow using the full or a part of the frequency band. In one example, the frequency band has a minimum frequency Fmin of 76 gigahertz (GHz) and a maximum frequency Fmax of 81 GHz.

Thus, while three identical linear frequency ramps or chirps with the same start frequency $f_{START}$ and stop frequency $f_{STOP}$ are illustrated in FIG. 2, it is contemplated that the start frequency $f_{START}$ and stop frequency $f_{STOP}$ may vary within a radar frame or across multiple radar frames. A local oscillator signal $S_{LO}(t)$ may be used to generate the RF signal $S_{RF}(t)$. Thus, it can be said that the local oscillator signal $S_{LO}(t)$ and the RF signal SRF(t) are frequency-modulated ramp signals that are generated within an operating frequency range (e.g., a predefined radar frequency range). For example, the local oscillator signal $S_{LO}(t)$ may be a frequency-modulated ramp signal that includes a plurality of frequency ramps each starting at a respective ramp start frequency and ending at a respective ramp stop frequency, and the respective ramp start frequencies and the respective ramp stop frequencies of the plurality of frequency ramps define a frequency range within the bounds of the operating frequency range. The frequency range of the plurality of frequency ramps may be defined by the lowest start frequency $f_{START}$ and the highest stop frequency $f_{STOP}$ among the frequency ramps in a given time interval (e.g., in an implementation in which the frequency increases within each frequency ramp). As noted above, the start frequency $f_{START}$ and the stop frequency $f_{STOP}$ of a sequence of frequency ramps may be the same and thus the center frequency of each ramp may be constant. Alternatively, the center frequency of each ramp (and therefore $f_{START}$ and $f_{STOP}$) may vary from ramp to ramp or after detecting an interference. The bandwidth (e.g., frequency range) of each ramp may also vary from ramp to ramp or after detecting an interference As indicated above, FIG. 2 is provided as an example. Other examples may differ from what is described with regard to FIG. 2.

Figure 3:
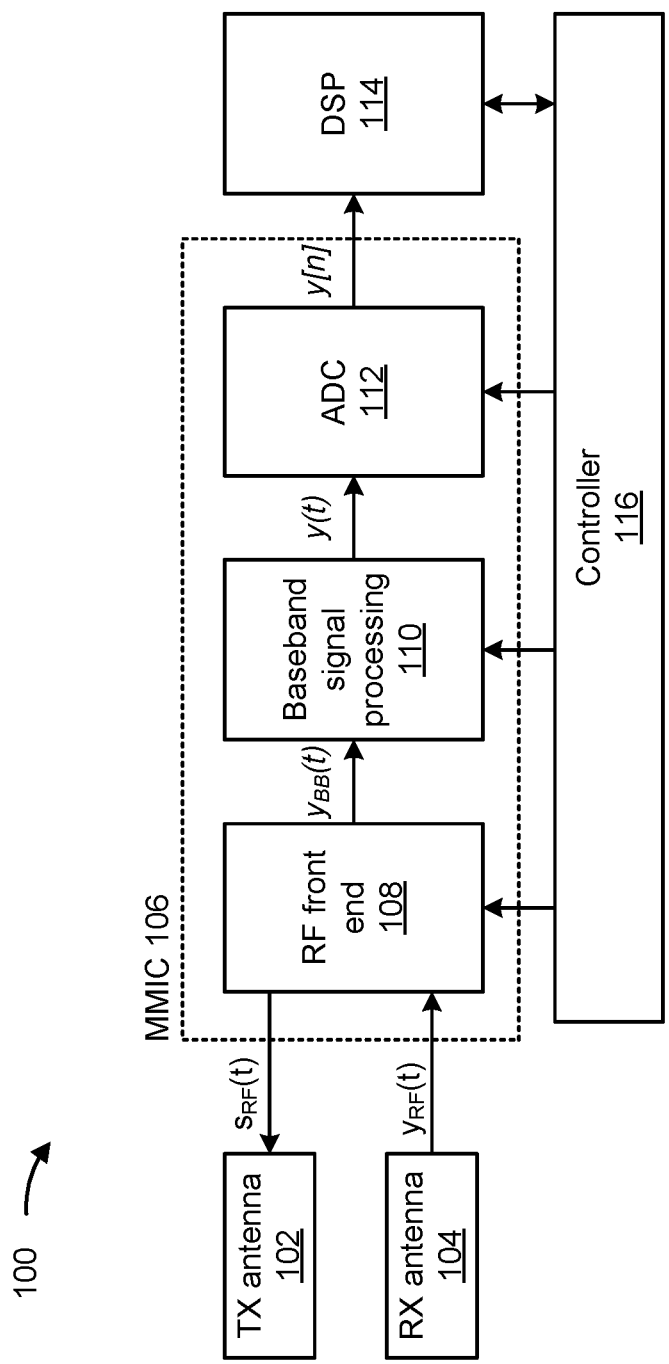
FIG. 3 is a block diagram that illustrates an example structure of the FMCW radar sensor.

FIG. 3 is a block diagram that illustrates an example structure of the radar sensor 100. As shown, the radar sensor 100 may include one or more TX antennas 102, one or more RX antennas 104, an MMIC 106 (comprising an RF front end 108, a baseband signal processing circuit 110, and an analog-to-digital convertor (ADC) 112), a digital signal processor (DSP) 114, and a controller 116.

In the radar sensor 100, the one or more TX antennas 102 and the one or more RX antennas 104 are connected to the RF front end 108. The RF front end 108 may include circuit components associated with performing RF signal processing. These circuit components may include, for example, a local oscillator (LO), one or more RF power amplifiers, one or more LNAs, one or more directional couplers (e.g., rat-race couplers, circulators, or the like), or one or more mixers for downmixing (e.g., down-converting or demodulating) RF signals into baseband or an intermediate frequency band (IF band). The RF front end 108 may be integrated into the MMIC 106 with one or more other components, as shown in FIG. 3. The IF band is sometimes also referred to as baseband. Accordingly, "baseband" and "IF band" may be used interchangeably herein. Baseband signals are those signals on the basis of which radar targets are detected.

It is noted that antenna-arrays may be used instead of single antennas. The depicted example shows a bistatic (or pseudo-monostatic) radar system which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX and RX channels, which allow the measurement of the direction (e.g., direction of arrival) from which the radar echoes are received.

In some implementations, the radar sensor 100 may include a plurality of TX antennas 102 and a plurality of RX antennas 104, which enables the radar sensor 100 to measure an AoA from which radar echoes are received. In the case of such MIMO systems, individual TX channels and RX channels may be constructed identically or similarly and may be distributed over one or more MMICs 106.

In some implementations, a signal emitted by the TX antenna 102 may be in a range from approximately 20 GHz to approximately 100 GHz, such as in a range between of approximately 76 GHz and approximately 81 GHz. As mentioned, a radar signal received by the RX antenna 104 includes radar echoes (e.g., chirp echo signals); that is to say those signal components that are backscattered at one or more targets.

The received RF signal $y_{RF}(t)$ is downmixed into, for example, baseband to generate a baseband signal $y_{BB}(t)$ and the baseband signal $y_{BB}(t)$ is processed further in baseband by way of analog signal processing performed by the baseband signal processing circuit 110. In some implementations, the baseband signal processing circuit 110 may be configured to filter and/or amplify the baseband signal $y_{BB}(t)$ to generate an analog (baseband) output signal y(t) that is derived from the baseband signal $y_{BB}$. The baseband signal $y_{BB}$ may also be referred to as analog radar data. It will be appreciated that if the received RF signals are down-converted into the IF band, the baseband signal processing circuit 110 may be referred to as an IF signal processing circuit. Thus, the baseband signal processing circuit 110, in general, may also be referred to as an analog signal processing circuit.

The ADC 112 may be configured to digitize the baseband signal $y_{BB}(t)$ or the analog output signal y(t) to generate a digital baseband signal y[n], also referred to as a digital output signal. The digital baseband signal y[n] is representative of the radar data received in the received RF signal $y_{RF}(t)$ The DSP 114 may be configured to further process the digital baseband signal y[n] in the digital domain. For example, the DSP 114 may be configured to receive the digital radar data in the digital baseband signal y[n] and process the digital radar data using the ramp parameters (e.g., respective ramp start frequencies, the respective ramp stop frequencies, a bandwidth of a frequency range, a ramp start time, or a sampling start time) used to generate the respective frequency ramps of the received RF signal $y_{RF}(t)$ in order to generate a range Doppler map, which may then be further used by the DSP 114 for object detection, classification, and so on.

In some implementations, the controller 116 is configured to control operation of the radar sensor 100 (e.g., by controlling one or more other components of the radar sensor 100, as indicated in FIG. 3). The controller 116 may include, for example, a microcontroller (µC).

In some implementations, the RF front end 108, the baseband signal processing circuit 110, the ADC 112, and/or the DSP 114 may be integrated in a single MMIC 106 (e.g., an RF semiconductor chip). Alternatively, two or more of these components may be distributed over multiple MMICs 106. In some implementations, the DSP 114 may be included in the controller 116. In some implementations, the techniques associated with TX monitoring and/or RX monitoring may be performed by one or more components of the radar sensor 100, such as by the DSP 114, the controller 116, or the like.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
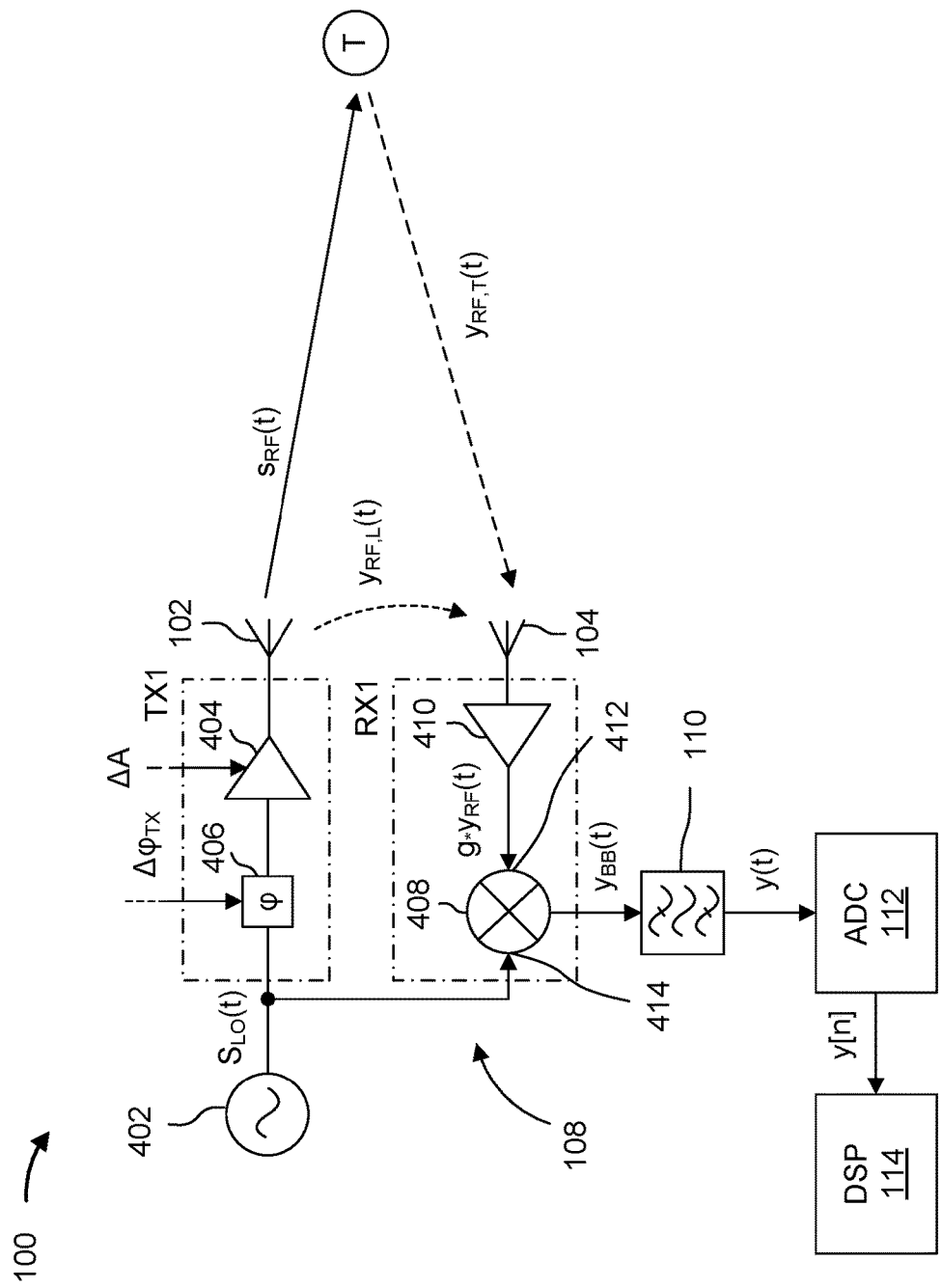
FIG. 4 illustrates an example implementation of the FMCW radar sensor according to the example from FIG. 3.

FIG. 4 illustrates an example implementation of the radar sensor 100 according to the example from FIG. 3. The example shown in FIG. 4 illustrates an example of the RF front end 108 of the radar sensor 100. FIG. 4 illustrates a simplified circuit diagram to show a fundamental structure of the RF front end 108 with one TX channel TX1 and one RX channel RX1. As noted above, the radar sensor 100 may in practice, include a plurality of TX channels and/or a plurality of RX channels.

The RF front end 108 comprises an LO 402 that generates an RF oscillator signal $S_{LO}(t)$. The RF oscillator signal $S_{LO}(t)$ is frequency-modulated during operation (e.g., as described above with reference to FIG. 2) and may also be referred to as an LO signal, an input RF signal, or a reference signal. In radar applications, the LO signal may be in a super high frequency (SHF) band (i.e., centimeter wave) or in an extremely high frequency (EHF) band (i.e., millimeter wave), for example, in a range between approximately 76 GHz and approximately 81 GHz. In some radar applications, the LO signal may be in a 24 GHz industrial, scientific, and medical (ISM) band. The LO signal may also be generated at a lower frequency and then up-converted using frequency multiplication units. The LO signal $s_{LO}(t)$ is processed both in the transmitted radar signal path TX1 (in the TX channel) and in the received RF signal path RX1 (in the RX channel).

While the local oscillator 402 may be provided on chip, the local oscillator 402 may also be provided external thereto. For example, the LO signal may be provided by an external local oscillator, and/or the LO signal may be provided to the MMIC 106 by another MMIC in a master/slave relationship. In particular, the MMIC 106 may be part of a MIMO radar system comprising a plurality of coupled (cascaded) MMICs in which one of the MMIC is configured as a master MMIC and the remaining MMIC are configured as slave MMICs. Each of the MMICs may include a local oscillator that generates a respective RF oscillator signal $S_{LO}(t)$. However, for the operation of the MIMO radar system, it may be beneficial for LO signals used by the MMICs to be coherent. Therefore, the LO signal may be generated in one MIMIC (e.g., the master MMIC), and a representation of the LO signal may be distributed to the slave MMICs. The representation may for example, be identical to the LO signal or the representation may be a frequency-divided signal which is then reconstructed at each MMIC by frequency multiplication. While in the following, a distribution of the LO signal will be described, it is to be understood that the following may also be applied to a frequency-divided distribution of the LO signal. In some implementations, the master MMIC may also use the LO signal to feed itself via a signal loop to ensure the LO signal is equally delayed between the master MMIC and the slave MMICs.

The RF oscillator signal $S_{LO}(t)$ is processed both in the transmission signal path TX1 (in the TX channel) and in the received signal path RX1 (in the RX channel). The RF signal $S_{RF}(t)$ (i.e., the outgoing radar signal) transmitted by the TX antenna 102 may be generated by amplifying the RF oscillator signal $S_{LO}(t)$, for example by an RF power amplifier 404, and may therefore be an amplified and possibly phase-shifted (e.g., by a phase shifter 406) version of the RF oscillator signal $S_{LO}(t)$. The transmission channel may also include a phase shifter 406 for applying a programmable phase shift φ to the RF oscillator signal $S_{LO}(t)$. For example, the phase shifter 406 may be configurable by a phase control signal $\Delta\varphi_{TX}$ and may be used to manipulate the overall phase lag caused by the transmission channel TX1. It is noted that the magnitude or power level (e.g., gain) of the RF power amplifier 404 may also be programmable and adjustable by a gain control signal ΔA.

Both the phase control signal $\Delta\varphi_{TX}$ and the gain control signal ΔA may be set and adjusted by a controller of the radar sensor 100 (e.g., controller 116). For example, by setting the power level of the RF power amplifier 404, the transmit power of the transmission channel TX1 may be set to a transmission power while the local oscillator 402 generates the RF oscillator signal $S_{LO}(t)$ with the frequency ramps intended to be transmitted as the RF signal $S_{RF}(t)$ (e.g., the transmission signal) and received as the received RF signal $y_{RF}(t)$ for the processing of radar data. The output of the RF power amplifier 404 can be coupled to the TX antenna 102 (in the case of a bistatic/pseudo-monostatic radar configuration). In some cases, the power level of the RF power amplifier 404 may be set to zero to disable the transmission channel TX1 (e.g., to disable a transmission of the RF signal $S_{RF}(t)$). In other words, while the power level of the RF power amplifier 404 is set to zero, the output power of the RF power amplifier 404 is zero and no signal is provided to the TX antenna 102.

The RX channel RX1 includes a mixer 408 and an optional amplifier 410. The received RF signal $y_{RF}(t)$ received by the RX antenna 104 is supplied to a receiver circuit in the RX channel RX1 and hence directly or indirectly to an RF port 412 of the mixer 408. In the present example, the received RF signal $y_{RF}(t)$ (antenna signal) is pre-amplified by the amplifier 410 with a gain g. The mixer 408 thus receives the amplified received RF signal $g \cdot y_{RF}(t)$. The amplifier 410 can be, for example, a low-noise amplifier.

The mixer 408 further includes a reference port 414 that may be supplied with the RF oscillator signal $S_{LO}(t)$ so that the mixer 408 down-converts the (pre-amplified) received RF signal $y_{RF}(t)$ to the baseband (or the IF band). The down-converted baseband signal (mixer output signal) is denoted by $y_{BB}(t)$. This baseband signal $y_{BB}(t)$ is processed further in the analog domain by the baseband signal processing circuit 110, substantially causing an amplification and a filtering (e.g., bandpass filtering, low-pass filtering, and/or high-pass filtering) in order to, for example, reject undesirable sidebands and/or mirror frequencies. The resulting analog output signal is denoted by y(t) and is supplied to the ADC 112. The ADC 112 is configured to convert the analog output signal y(t) into the digital baseband signal y[n] (e.g., the digital output signal) that undergoes further digital post-processing via a signal processor (e.g., the DSP 114). Methods for further digital processing of the digital baseband signal y[n] may include, for example, range Doppler analysis.

In the present example, the mixer 408 may down-convert the pre-amplified received RF signal $g \cdot y_{RF}(t)$ (e.g., the amplified antenna signal) into baseband. In some implementations, the mixing may be performed in one stage (i.e., from the RF band directly into baseband) or over one or more intermediate stages (i.e., from the RF band into an intermediate frequency band and further into baseband). In the latter case, the mixer 408 may comprise a plurality of individual mixer stages connected in series. In some implementations, a mixer stage may include an in-phase and quadrature (IQ) mixer that generates two baseband signals (in-phase and quadrature signals) that can be interpreted as a real part and an imaginary part of a complex baseband signal. In other words, the IQ mixer may be used to generate complex baseband signals (e.g., including in-phase and quadrature components).

As depicted in FIG. 4, the RX antenna 104 of the RX channel RX1 may receive a superimposition comprising a received RF signal $y_{RF,T}(t)$ reflected from the target T and a direct crosstalk from the transmitting antenna 102, which is also referred to as leakage signal $y_{RF,L}(t)$. Reflections from an object situated right in front of the antennas (sometimes also called "blockers") are also referred to as crosstalk here and may contribute in equal measure to the leakage signal. Both signals $y_{RF,T}(t)$ and $y_{RF,L}(t)$ are substantially delayed and attenuated versions of the RF signal $S_{RF}(t)$ of the transmission channel TX1. A time delay between the RF signal $S_{RF}(t)$ of the transmission channel TX1 and the received leakage signal $y_{RF,L}(t)$ (e.g., the crosstalk signal) is relatively short in comparison with a time delay of the received RF signal $y_{RF,T}(t)$ received from the target T. In a normal radar mode, the received leakage signal $y_{RF,L}(t)$ may therefore cause a correspondingly low-frequency component in the baseband signal $y_{BB}(t)$, and this low-frequency component of the baseband signal $y_{BB}(t)$ may be rejected in the baseband signal processing circuit 110. For this purpose, the baseband signal processing circuit 110 may include a bandpass filter, a low-pass filter, and/or a high-pass filter having a suitable cut-off frequency.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 4 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

Figure 5A:
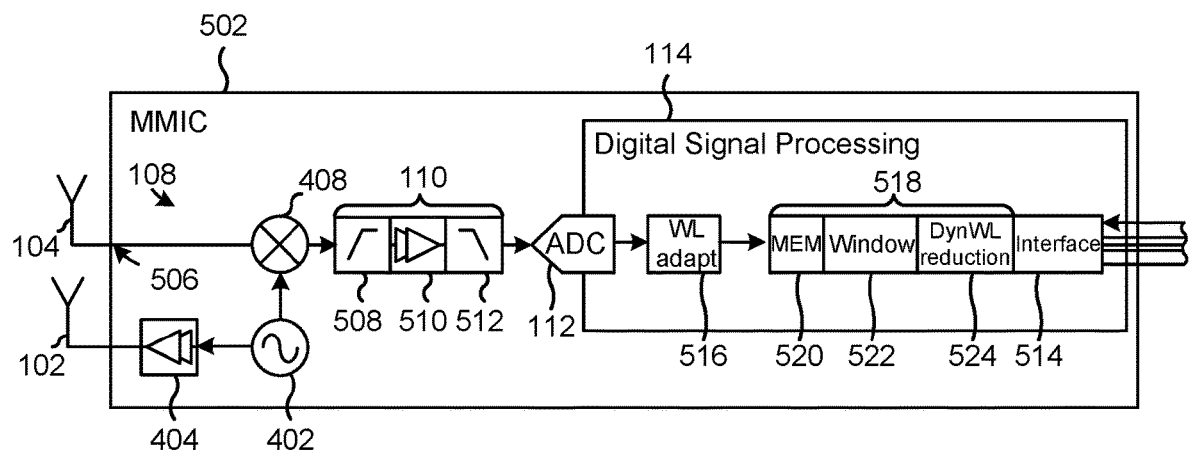
FIGS. 5A and 5B illustrate a radar system according to one or more implementations.
Figure 5B:
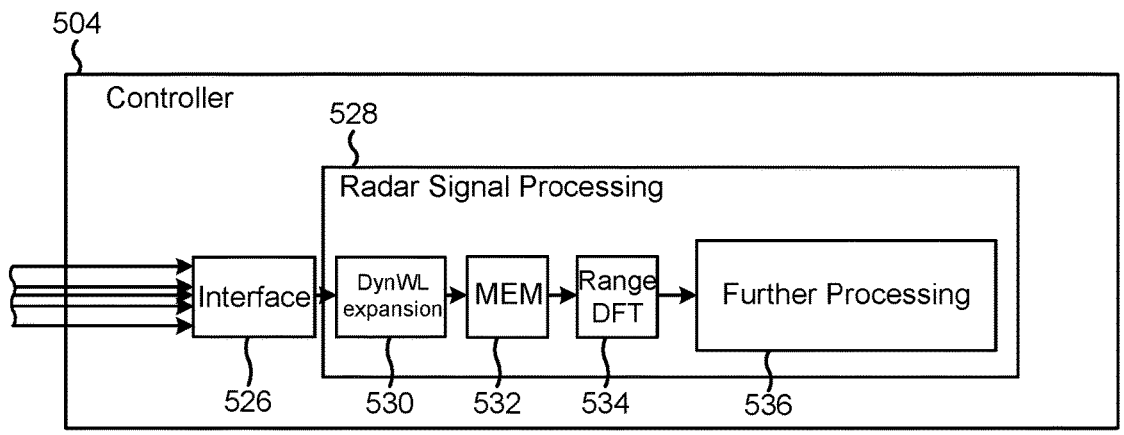

FIGS. 5A and 5B illustrate a radar system according to one or more implementations. FIG. 5A illustrates an example radar MMIC 502 and FIG. 5B illustrates an example controller 504 (e.g., a microcontroller). In some implementations, the radar MMIC 502 may be similar to the MMIC 106 and the controller 504 may be similar to the controller 116, as described in connection with FIGS. 1-4. The radar MMIC 502 and the controller 504 may be electrically coupled to each other for bi-directional communications. For example, the radar MMIC 502 may be configured to transmit, and the controller 504 may be configured to receive, compressed radar data. In addition, the controller 504 may be configured to transmit, and the radar MMIC 502 may be configured to receive, control information and/or configuration information.

Turning to FIG. 5A, the radar MMIC 502 may include the TX antenna 102, the RX antenna 104, the RF front end 108, the baseband signal processing circuit 110, the ADC 112, and the DSP 114, as described in connection with FIGS. 1-4. The radar MMIC 502 may include an RF input 506 configured to receive an RF signal comprising a plurality of frequency ramps. For example, the RF signal may be a reflected RF signal (e.g., received RF signal $y_{RF}(t)$) and the plurality of frequency ramps may be echoes of the frequency ramps of the RF signal $S_{RF}(t)$ transmitted by the TX antenna 102.

The RF front end 108 may include the local oscillator 402, the RF power amplifier 404, and the mixer 408, as described in connection with FIG. 4. The mixer 408 may also be considered part of the baseband signal processing circuit 110. The mixer 408 may be configured to convert the RF signal into a baseband signal (e.g., baseband signal $y_{BB}(t)$) comprising a plurality of analog signal segments, wherein each analog signal segment of the plurality of analog signal segments corresponds to a different frequency ramp of the plurality of frequency ramps. In other words, each analog signal segment of the baseband signal corresponds to a single frequency ramp of the RF signal received at the RF input 506. Each analog signal segment may correspond only to a payload part of a corresponding frequency ramp.

The baseband signal processing circuit 110 may include a high-pass filter 508, an amplifier 510, and/or a low-pass filter 512 for amplifying and/or filtering the baseband signal. The high-pass filter 508 may be used as a radar equation equalizer to reduce a required dynamic range further down the receiver processing chain. The low-pass filter 512 may be used as an anti-aliasing filter for the ADC 112.

The ADC 112 may be configured to convert the plurality of analog signal segments into a plurality of respective digital signal segments, wherein each digital signal segment of the plurality of respective digital signal segments comprises a plurality of digital samples corresponding to a respective analog signal segment. For example, in some implementations, the ADC 112 may be configured to generate 1024 digital samples for each analog signal segment. However, the number of digital samples may be configurable and is not limited thereto.

The DSP 114 may be configured to receive the plurality of respective digital signal segments as a sequence of digital signal segments and perform digital signal processing thereon, including data compression. The DSP 114 may be configured to sequentially process the plurality of respective digital signal segments such that data compression is performed on one digital signal segment at a time.

The radar MMIC 502 may include a data transmission interface 514 that is configured to transmit compressed radar data generated by the DSP 114. For example, the data transmission interface 514 may be configured to transmit the compressed radar data in a packet-oriented data transmission. The data transmission interface 514 may be configured to sequentially transmit compressed radar data corresponding to the plurality of respective digital signal segments such that the compressed radar data for a first digital signal segment is transmitted in its entirety before the compressed radar data for a next digital signal segment in the sequence of digital signal segments is transmitted.

The DSP 114 may include a word length adaptation unit 516 that is configured to generate a digital word having a predetermined word length (e.g., a fixed word length) for each digital sample. In other words, the word length adaptation unit 516 may be configured to convert each digital sample into a corresponding digital word having the predetermined word length. For example, in some implementations, the predetermined word length may be 12 bits, but is not limited thereto. Thus, the word length adaptation unit 516 may be configured to convert the digital samples into uncompressed digital words.

The DSP 114 may further include an encoder 518, including a memory 520, a windowing unit 522, and a dynamic word length reduction unit 524. The encoder 518 may be configured to receive a single digital signal segment of the plurality of respective digital signal segments and compress the plurality of digital samples of the single digital signal segment based on a data compression that has a defined correlation with a windowing function to generate compressed radar data corresponding to the single digital signal segment. For example, the memory 520 may be configured to store the digital samples of the single digital signal segment for the data compression. In some implementations, the memory 520 may be configured to store the uncompressed digital words of the single digital signal segment (e.g., the digital words corresponding to a single frequency ramp) for the data compression. For example, the memory 520 may be able to store one full chirp of data. In other words, the encoder 518 may be configured to compress one digital signal segment at a time, where the one digital signal segment corresponds to one frequency ramp of the RF signal received at the RF input 506. In some implementations, the memory 520 may be limited to storing only one full chirp of data. In some implementations, the memory 520 may be configured to store less than one full chirp of data, for example, a single digital sample or a single digital word.

The windowing unit 522, implemented in one or more processors of the DSP 114, may be configured to apply a windowing function to the digital samples of the single digital signal segment (e.g., to the uncompressed digital words of the single digital signal segment) stored in the memory 520. The windowing function may be configured to obtain an optimized frequency domain resolution (e.g., FFT bin leakage) and side lobe suppression. As a result of applying the windowing function to the plurality of digital samples of the single digital signal segment, the windowing unit 522 is configured to generate a plurality of respective scaled sample values for the plurality of digital samples of the single digital signal segment.

The defined correlation with the windowing function may be a curve comprising at least one ascending portion and at least one descending portion. For example, the windowing function may be a Hamming window or a Chebyshev window, but is not limited thereto. In some implementations, the windowing function may be symmetric about the center of a predetermined time interval of the windowing function. In some implementations, the windowing function may be asymmetric about the center of the predetermined time interval. Accordingly, the windowing unit 522 may be configured to scale the plurality of digital samples of the single digital signal segment according to the curve.

For example, the windowing unit 522 may be configured to apply a plurality of scaling factors to the plurality of digital samples of the single digital signal segment, where the plurality of scaling factors follow the curve of the windowing function. In other words, the scaling factors may vary over time based on the curve of the windowing function. One scaling factor may be applied to each digital sample. Thus, because the ADC 112 generates the plurality of digital samples of the single digital signal segment sequentially over time in a time domain, the scaling of the plurality of digital samples of the single digital signal segment varies over time based on the curve of the windowing function.

The dynamic word length reduction unit 524, implemented in one or more processors of the DSP 114, may be configured to apply a dynamic word length reduction to the plurality of respective scaled sample values according to the defined correlation with the windowing function to generate a plurality of digital words (compressed) corresponding to the plurality of respective scaled sample values, respectively. With the knowledge of the scaling factors applied based on the windowing function, a number of bits used to represent a certain digital sample out of the single digital signal segment (e.g., out of a single frequency ramp or chirp) can be adjusted accordingly by the dynamic word length reduction unit 524 without losing information. The plurality of digital words generated by the dynamic word length reduction unit 524 may be referred to as reduced-length digital words that have a plurality of reduced word lengths. The reduced-length digital words may be considered "reduced" in comparison to a word length before the data compression. Accordingly, the plurality of digital words (compressed) generated by the dynamic word length reduction unit 524 may be referred to as compressed radar data. The compressed radar data represents the baseband signal $y_{BB}(t)$ in the time domain.

In some implementations, the dynamic word length reduction unit 524 may apply the plurality of reduced word lengths according to the curve of the windowing function. As a result, a reduced word length of a respective digital sample may correspond to a scaling factor applied to the respective digital sample. For example, a shorter word length (e.g., a word length having less bits) may correspond of a smaller scaling factor (e.g., a scaling factor closer to zero). In contrast, a longer word length (e.g., a word length having more bits) may correspond of a larger scaling factor (e.g., a scaling factor closer to one). Accordingly, different word lengths may be correlated with different scaling factors according to the defined correlation with the windowing function. Said differently, a number of bits of each reduced-length digital word of the plurality of reduced-length digital words may be scaled according to the defined correlation with the windowing function.

In some implementations, the dynamic word length reduction unit 524 may apply the dynamic word length reduction to the plurality of respective scaled sample values by omitting most significant bits (MSBs) in the plurality of uncompressed digital words according to the defined correlation with the windowing function to generate the plurality of digital words (compressed) that have the plurality of reduced word lengths. As noted above, the plurality of digital words (compressed) generated by the dynamic word length reduction unit 524 may be referred to as compressed radar data. Thus, the compressed radar data may include a plurality of digital words (compressed) corresponding to the plurality of digital samples of the single digital signal segment, respectively, and the data compression may be a lossless compression that includes scaling the plurality of digital samples of the single digital signal segment with the windowing function to generate scaled digital samples and removing the MSBs from the scaled digital samples according to the defined correlation with the windowing function to generate the plurality of digital words (compressed). Removing the MSBs from the scaled digital samples may include either omitting the MSBs or rounding and then omitting the MSBs.

Based on the above, the data compression applied by the encoder 518 may be referred to as an inhomogeneous data compression. Accordingly, the encoder 518 may be configured to apply the inhomogeneous data compression to the plurality of digital samples of the single digital signal segment such that an amount of compression applied to the plurality of digital samples of the single digital signal segment varies across the plurality of digital samples of the single digital signal segment in the time domain (e.g., the amount of compression applied to the plurality of digital samples varies over time) according to the defined correlation with the windowing function.

In some implementations, the encoder 518 may be configured to apply the data compression to the plurality of digital samples of the single digital signal segment based on a plurality of scaling factors that correspond to the defined correlation with the windowing function. For example, the encoder 518 may be configured to apply the data compression to a first digital sample subset of the plurality of digital samples based on a first scaling factor of the plurality of scaling factors, the encoder 518 may be configured to apply the data compression to a second digital sample subset of the plurality of digital samples based on a second scaling factor of the plurality of scaling factors that is different from the first scaling factor, and the encoder 518 may be configured to apply the data compression to a third digital sample subset of the plurality of digital samples based on a third scaling factor of the plurality of scaling factors, where the third scaling factor is different from the second scaling factor. In addition, the second digital sample subset may be between the first digital sample subset and the third digital sample subset in a time domain.

A digital sample subset (e.g., the first digital sample subset, the second digital sample subset, and/or the third digital sample subset) may include one digital sample or a more than one digital sample of the plurality of digital samples of the single digital signal segment. In some implementations, the first digital sample subset, the second digital sample subset, and the third digital sample subset may be consecutive subsets. In some implementations, the first digital sample subset, the second digital sample subset, and the third digital sample subset may have a same number of digital samples. In some implementations, the first digital sample subset, the second digital sample subset, and the third digital sample subset may have one or more further digital samples of the of the single digital signal segment therebetween. In some implementations, the first scaling factor and the third scaling factor may be equal (e.g., a same scaling factor).

In some implementations, the first scaling factor and the third scaling factor may be less than 1, such that the first digital sample subset is compressed according to the first scaling factor and the third digital sample subset is compressed according to the third scaling factor, and the second scaling factor may be 1, such that the second digital sample subset is not compressed.

In some implementations, the first scaling factor and the third scaling factor may be equal and less than 1, such that the first digital sample subset and the third digital sample subset are compressed by a first amount corresponding to the first scaling factor and the third scaling factor, and the second scaling factor may be less than 1, such that the second digital sample subset is compressed by a second amount corresponding to the second scaling factor.

Turning to FIG. 5B, the controller 504 may include a data transmission interface 526 and a DSP 528 that is configured to perform radar signal processing. The data transmission interface 526 may be configured to receive (e.g., from the data transmission interface 514) the compressed radar data comprising the plurality of digital words (compressed) generated by the dynamic word length reduction unit 524. In other words, the data transmission interface 526 may be configured to receive the plurality of reduced-length digital words (e.g., a first plurality of digital words) corresponding to a single digital signal segment. The DSP 528 may include a decoder 530, a memory 532, a range-discrete Fourier transform (DFT) unit 534, and one or more additional processing units 536. In some implementations, an FFT is used as a DFT. As a result, "DFT" and "FFT" may be used interchangeably.

The decoder 530 may include a dynamic word length expansion unit that is configured to decompress the first plurality of digital words by applying a dynamic word length expansion to the plurality of reduced-length digital words according to the defined correlation with the windowing function to generate a second plurality of digital words (decompressed) (e.g., decompressed radar data). Thus, the defined correlation with the windowing function is known to both the DSP 114 and the DSP 528.

Each digital word of the second plurality of digital words has a same number of bits corresponding to an expanded word length. For example, the expanded word length may be 12 bits and each digital word of the second plurality of digital words (decompressed) may have 12 bits. However, it will be appreciated that the expanded word length may be configurable and is not limited to a certain number of bits. The word length expansion is "dynamic" in the sense that an amount of expansion varies based on a number of bits contained in a reduced-length digital word, where a lower number of received bits require a larger word length expansion to be expanded to the expanded word length, as compared with a higher number of received bits.

The second plurality of digital words (decompressed) correspond to a single frequency ramp of the RF signal received at the RF input 506. Thus, the decoder 530 may be configured to decompress radar data one frequency ramp at a time and store the second plurality of digital words (decompressed) as decompressed radar data in the memory 532. In some implementations, the memory 532 may be able to store one full chirp of data. In some implementations, the memory 532 may be limited to storing only one full chirp of data.

The range-DFT unit 534 may be configured to receive the second plurality of digital words (decompressed) corresponding to one frequency ramp from the memory 532, and apply a DFT to the second plurality of digital words to generate a range-DFT. It is noted that, because the windowing function is applied by the MMIC 502 at the windowing unit 522, a windowing function may not be applied by the DSP 528 prior to the range-DFT unit 534. This has an additional advantage of eliminating a processing step at the controller 504 that may otherwise be performed prior to the processing performed by the range-DFT unit 534, thereby saving signal processing resources and improving data throughput.

The additional processing units 536 may be implemented in one or more processors may include a windowing unit for a Doppler-DFT, a Doppler DFT unit (e.g., for calculating velocities of detected objects), and the like.

As indicated above, FIGS. 5A and 5B are provided merely as examples. Other examples are possible and may differ from what was described with regard to FIGS. 5A and 5B. The number and arrangement of components shown in FIGS. 5A and 5B are provided as an example. In practice, the radar system may include additional components, fewer components, different components, or differently arranged components than those shown in FIGS. 5A and 5B. Two or more components shown in FIGS. 5A and 5B may be implemented within a single component, or a single component shown in FIGS. 5A and 5B may be implemented as multiple, distributed components. Additionally, or alternatively, a set of components (e.g., one or more components) of the radar system shown in FIGS. 5A and 5B may perform one or more functions described as being performed by another set of components of the radar system.

Figure 6A:
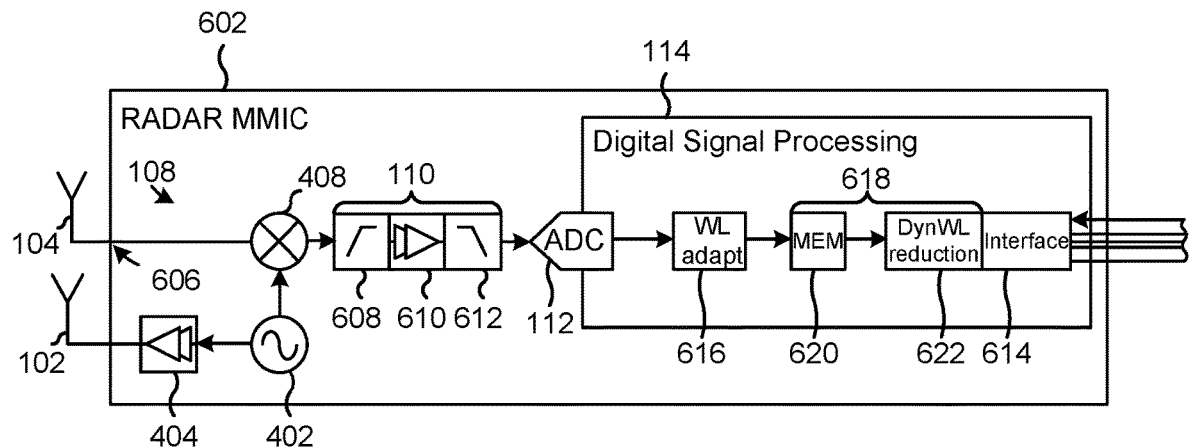
FIGS. 6A and 6B illustrate a radar system according to one or more implementations.
Figure 6B:
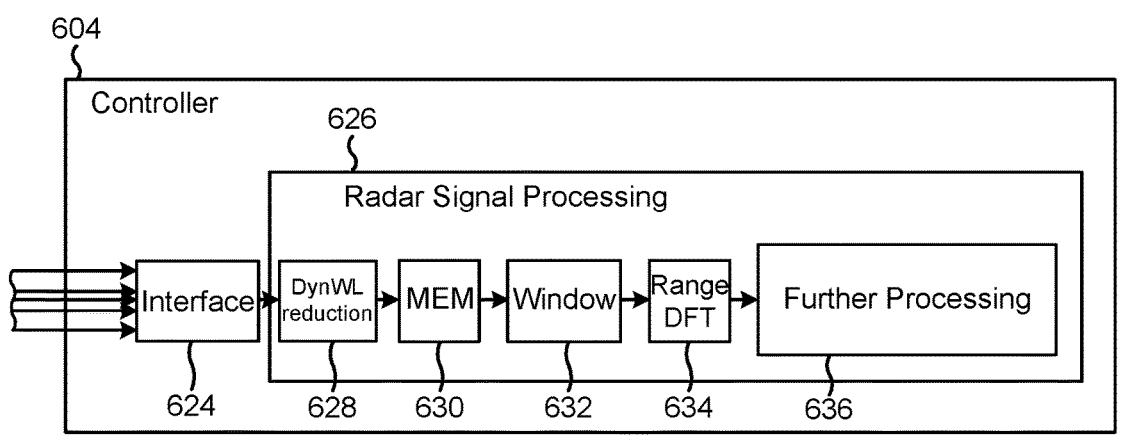

FIGS. 6A and 6B illustrate a radar system according to one or more implementations. FIG. 6A illustrates an example radar MMIC 602 and FIG. 6B illustrates an example controller 604 (e.g., a microcontroller). In some implementations, the radar MMIC 602 may be similar to the MMIC 106 and the controller 604 may be similar to the controller 116, as described in connection with FIGS. 1-4. The radar MMIC 602 and the controller 604 may be electrically coupled to each other for bi-directional communications. For example, the radar MMIC 602 may be configured to transmit and the controller 604 may be configured to receive compressed radar data. In addition, the controller 604 may be configured to transmit and the radar MMIC 602 may be configured to receive control information and/or configuration information.

Turning to FIG. 6A, the radar MMIC 602 may include the TX antenna 102, the RX antenna 104, the RF front end 108, the baseband signal processing circuit 110, the ADC 112, and the DSP 114, as described in connection with FIGS. 1-4. The radar MMIC 602 may include an RF input 606 configured to receive an RF signal comprising a plurality of frequency ramps. For example, the RF signal may be a reflected RF signal (e.g., received RF $y_{RF}(t)$ signal) and the plurality of frequency ramps may be echoes of the frequency ramps of the RF signal $S_{RF}(t)$.

The RF front end 108 may include the local oscillator 402, the RF power amplifier 404, and the mixer 408, as described in connection with FIG. 4. The mixer 408 may also be considered part of the baseband signal processing circuit 110. The mixer 408 may be configured to convert the RF signal into a baseband signal (e.g., baseband signal) comprising a plurality of analog signal segments, wherein each analog signal segment of the plurality of analog signal segments corresponds to a different frequency ramp of the plurality of frequency ramps. In other words, each analog signal segment of the baseband signal corresponds to a single frequency ramp of the RF signal received at the RF input 606. Each analog signal segment may correspond only to a payload part of a corresponding frequency ramp.

The baseband signal processing circuit 110 may include a high-pass filter 608, an amplifier 610, and/or a low-pass filter 612 for amplifying and/or filtering the baseband signal.

The ADC 112 may be configured to convert the plurality of analog signal segments into a plurality of respective digital signal segments, wherein each digital signal segment of the plurality of respective digital signal segments comprises a plurality of digital samples corresponding to a respective analog signal segment. For example, in some implementations, the ADC 112 may be configured to generate 1,024 digital samples for each analog signal segment. However, the number of digital samples may be configurable and is not limited thereto.

The DSP 114 may be configured to receive the plurality of respective digital signal segments as a sequence of digital signal segments and perform digital signal processing thereon, including data compression. The DSP 114 may be configured to sequentially process the plurality of respective digital signal segments such that data compression is performed on one digital signal segment at a time.

The radar MMIC 602 may include a data transmission interface 614 that is configured to transmit compressed radar data generated by the DSP 114. For example, the data transmission interface 614 may be configured to transmit the compressed radar data in a packet-oriented data transmission. The data transmission interface 614 may be configured to sequentially transmit compressed radar data corresponding to the plurality of respective digital signal segments such that the compressed radar data for a first digital signal segment is transmitted in its entirety before the compressed radar data for a next digital signal segment in the sequence of digital signal segments is transmitted.

The DSP 114 may include a word length adaptation unit 616 that is configured to generate a digital word having a predetermined word length (e.g., a fixed word length) for each digital sample. In other words, the word length adaptation unit 616 may be configured to convert each digital sample into a corresponding digital word having the predetermined word length. For example, in some implementations, the predetermined word length may be 12 bits, but is not limited thereto. Thus, the word length adaptation unit 616 may be configured to convert the digital samples into uncompressed digital words.

The DSP 114 may further include an encoder 618, including a memory 620 and a dynamic word length reduction unit 622. The encoder 618 may be configured to receive a single digital signal segment of the plurality of respective digital signal segments and compress the plurality of digital samples of the single digital signal segment based on a data compression that has a defined correlation with a windowing function to generate compressed radar data corresponding to the single digital signal segment. For example, the memory 620 may be configured to store the digital samples of the single digital signal segment for the data compression. In some implementations, the memory 620 may be configured to store the uncompressed digital words of the single digital signal segment (e.g., the digital words corresponding to a single frequency ramp) for the data compression. For example, the memory 620 may be able to store one full chirp of data. In other words, the encoder 618 may be configured to compress one digital signal segment at a time, where the one digital signal segment corresponds to one frequency ramp of the RF signal received at the RF input 606. In some implementations, the memory 620 may be limited to storing only one full chirp of data. In some implementations, the memory 620 may be configured to store less than one full chirp of data, for example, a single digital sample or a single digital word.

The dynamic word length reduction unit 622, implemented in one or more processors of the DSP 114, may be configured to apply a dynamic word length reduction to the plurality of digital samples or to the uncompressed digital words according to the defined correlation with a windowing function to generate a plurality of digital words (compressed) corresponding to the plurality of digital samples, respectively. The plurality of digital words (compressed) may have a plurality of reduced word lengths. With the knowledge of the defined correlation with the windowing function, a number of bits used to represent a certain digital sample out of the single digital signal segment (e.g., out of a single frequency ramp or chirp) can be adjusted accordingly by the dynamic word length reduction unit 622. The plurality of digital words generated by the dynamic word length reduction unit 622 may be referred to as reduced-length digital words that have the plurality of reduced word lengths. The reduced-length digital words may be considered "reduced" in comparison to a word length before the data compression. Accordingly, the plurality of digital words (compressed) generated by the dynamic word length reduction unit 622 may be referred to as compressed radar data. The compressed radar data represents the baseband signal $y_{BB}(t)$ in the time domain.

The defined correlation with the windowing function may be a curve comprising at least one ascending portion and at least one descending portion. For example, the windowing function may be a Hamming window or a Chebyshev window, but is not limited thereto. In some implementations, the windowing function may be symmetric about the center of a predetermined time interval of the windowing function. In some implementations, the windowing function may be asymmetric about the center of the predetermined time interval. For example, the data compression performed by the dynamic word length reduction unit 622 may be a lossy compression that includes removing least significant bits (LSBs) from the plurality of digital samples of the single digital signal segment according to the defined correlation with the windowing function to generate the plurality of digital words (compressed) having the plurality of reduced word lengths. Removing the LSBs from the plurality of digital samples may include either omitting the LSBs or rounding and then omitting the LSBs. Thus, because the ADC 112 generates the plurality of digital samples of the single digital signal segment sequentially over time in a time domain, the dynamic reduction of word lengths applied to the plurality of digital samples varies over time based on the curve of the windowing function.

For example, in some implementations, the dynamic word length reduction unit 622 may apply the plurality of reduced word lengths according to the curve of the windowing function. As a result, a reduced word length of a respective digital sample may correspond to a scaling factor of the windowing function that corresponds to the respective digital sample. For example, a shorter word length (e.g., a word length having less bits) may correspond of a smaller scaling factor (e.g., a scaling factor closer to zero) of the windowing function. In contrast, a longer word length (e.g., a word length having more bits) may correspond of a larger scaling factor (e.g., a scaling factor closer to one) of the windowing function. Accordingly, different word lengths may be correlated with different scaling factors according to the defined correlation with the windowing function. Said differently, a number of bits of each reduced-length digital word of the plurality of reduced-length digital words may be scaled according to the defined correlation with the windowing function.

Based on the above, the data compression applied by the encoder 618 may be referred to as an inhomogeneous data compression. Accordingly, the encoder 618 may be configured to apply the inhomogeneous data compression to the plurality of digital samples of the single digital signal segment such that an amount of compression applied to the plurality of digital samples of the single digital signal segment varies across the plurality of digital samples of the single digital signal segment in the time domain (e.g., the amount of compression applied to the plurality of digital samples varies over time) according to the defined correlation with the windowing function.

In some implementations, the encoder 618 may be configured to apply the data compression to the plurality of digital samples of the single digital signal segment based on a plurality of scaling factors that correspond to the defined correlation with the windowing function. For example, the encoder 618 may be configured to apply the data compression (e.g., a first word length reduction) to a first digital sample subset of the plurality of digital samples based on a first scaling factor of the plurality of scaling factors, the encoder 618 may be configured to apply the data compression (e.g., a second word length reduction) to a second digital sample subset of the plurality of digital samples based on a second scaling factor of the plurality of scaling factors that is different from the first scaling factor, and the encoder 618 may be configured to apply the data compression (e.g., a third word length reduction) to a third digital sample subset of the plurality of digital samples based on a third scaling factor of the plurality of scaling factors, where the third scaling factor is different from the second scaling factor. In addition, the second digital sample subset may be between the first digital sample subset and the third digital sample subset in a time domain.

A digital sample subset (e.g., the first digital sample subset, the second digital sample subset, and/or the third digital sample subset) may include one digital sample or a more than one digital sample of the plurality of digital samples of the single digital signal segment. In some implementations, the first digital sample subset, the second digital sample subset, and the third digital sample subset may be consecutive subsets. In some implementations, the first digital sample subset, the second digital sample subset, and the third digital sample subset may have a same number of digital samples. In some implementations, the first digital sample subset, the second digital sample subset, and the third digital sample subset may have one or more further digital samples of the of the single digital signal segment therebetween. In some implementations, the first scaling factor and the third scaling factor may be equal (e.g., a same scaling factor).

In some implementations, the first scaling factor and the third scaling factor may be less than 1, such that the first digital sample subset is compressed according to the first scaling factor and the third digital sample subset is compressed according to the third scaling factor, and the second scaling factor may be 1, such that the second digital sample subset is not compressed.

In some implementations, the first scaling factor and the third scaling factor may be equal and less than 1, such that the first digital sample subset and the third digital sample subset are compressed by a first amount corresponding to the first scaling factor and the third scaling factor, and the second scaling factor may be less than 1, such that the second digital sample subset is compressed by a second amount corresponding to the second scaling factor.

Turning to FIG. 6B, the controller 604 may include a data transmission interface 624 and a DSP 626 that is configured to perform radar signal processing. The data transmission interface 624 may be configured to receive (e.g., from the data transmission interface 614) the compressed radar data comprising the plurality of digital words (compressed) generated by the dynamic word length reduction unit 622. In other words, the data transmission interface 624 may be configured to receive the plurality of reduced-length digital words (e.g., a first plurality of digital words) corresponding to a single digital signal segment. The DSP 626 may include a decoder 628, a memory 630, a windowing unit 632, a range-DFT unit 634, and one or more additional processing units 636. In some implementations, an FFT is used as a DFT. As a result, "DFT" and "FFT" may be used interchangeably.

Here, because the DSP 114 of the MMIC 602 does not use a windowing unit for data compression, the DSP 626 includes the windowing unit 632 for applying the windowing function to decompressed digital samples prior to processing performed by the range-DFT unit 634. The windowing function of the windowing unit 632 may serve as a basis for the defined correlation with the windowing function that is used by the dynamic word length reduction unit 622 and the decoder 628. An advantage of this configuration is that the DSP 114 of the MMIC 602 is less complex, as compared with the DSP 114 of the MMIC 502. Thus, the MMIC 602 may have lower manufacturing costs and may use less processing resources for the data compression when compared to the manufacturing costs and the processing resources of the MMIC 502. However, a disadvantage of this configuration, as compared with the configuration shown in FIGS. 5A and 5B, is that, for a same amount of compression, truncation or rounding errors are difficult to avoid. The truncation or rounding errors may add additional noise to the radar signal (e.g., to the signal processing channel) such that the compression/decompression of the radar data is not perfectly lossless.

The decoder 628 may include a dynamic word length expansion unit that is configured to decompress the first plurality of digital words by applying a dynamic word length expansion to the plurality of reduced-length digital words according to the defined correlation with the windowing function to generate a second plurality of digital words (decompressed) (e.g., decompressed radar data). Thus, the defined correlation with the windowing function is known to both the DSP 114 and the DSP 626.

Each digital word of the second plurality of digital words has a same number of bits corresponding to an expanded word length. For example, the expanded word length may be 12 bits and each digital word of the second plurality of digital words (decompressed) may have 12 bits. However, it will be appreciated that the expanded word length may be configurable and is not limited to a certain number of bits. The word length expansion is "dynamic" in the sense that an amount of expansion varies based on a number of bits contained in a reduced-length digital word, where a lower number of received bits require a larger word length expansion to be expanded to the expanded word length, as compared with a higher number of received bits.

The second plurality of digital words (decompressed) correspond to a single frequency ramp of the RF signal received at the RF input 606. Thus, the decoder 628 may be configured to decompress radar data one frequency ramp at a time and store the second plurality of digital words (decompressed) as decompressed radar data in the memory 630. In some implementations, the memory 630 may be able to store one full chirp of data. In some implementations, the memory 630 may be limited to storing only one full chirp of data.

The windowing unit 632, implemented in one or more processors of the DSP 626, may be configured to receive the second plurality of digital words (decompressed) from the memory 630 and apply the windowing function thereto. The windowing function may be configured to scale the second plurality of digital words in a time domain according to the curve of the window function for DFT processing. The windowing function may result in smoother signal for the range-DFT unit 634.

The range-DFT unit 634 may be configured to receive the scaled second plurality of digital words corresponding to one frequency ramp from the windowing unit 632, and apply a DFT to the scaled second plurality of digital words to generate a range-DFT.

The additional processing units 636 may be implemented in one or more processors may include a windowing unit for a Doppler-DFT, a Doppler DFT unit (e.g., for calculating velocities of detected objects), and the like.

As indicated above, FIGS. 6A and 6B are provided merely as examples. Other examples are possible and may differ from what was described with regard to FIGS. 6A and 6B. The number and arrangement of components shown in FIGS. 6A and 6B are provided as an example. In practice, the radar system may include additional components, fewer components, different components, or differently arranged components than those shown in FIGS. 6A and 6B. Two or more components shown in FIGS. 6A and 6B may be implemented within a single component, or a single component shown in FIGS. 6A and 6B may be implemented as multiple, distributed components. Additionally, or alternatively, a set of components (e.g., one or more components) of the radar system shown in FIGS. 6A and 6B may perform one or more functions described as being performed by another set of components of the radar system.

Figure 7:
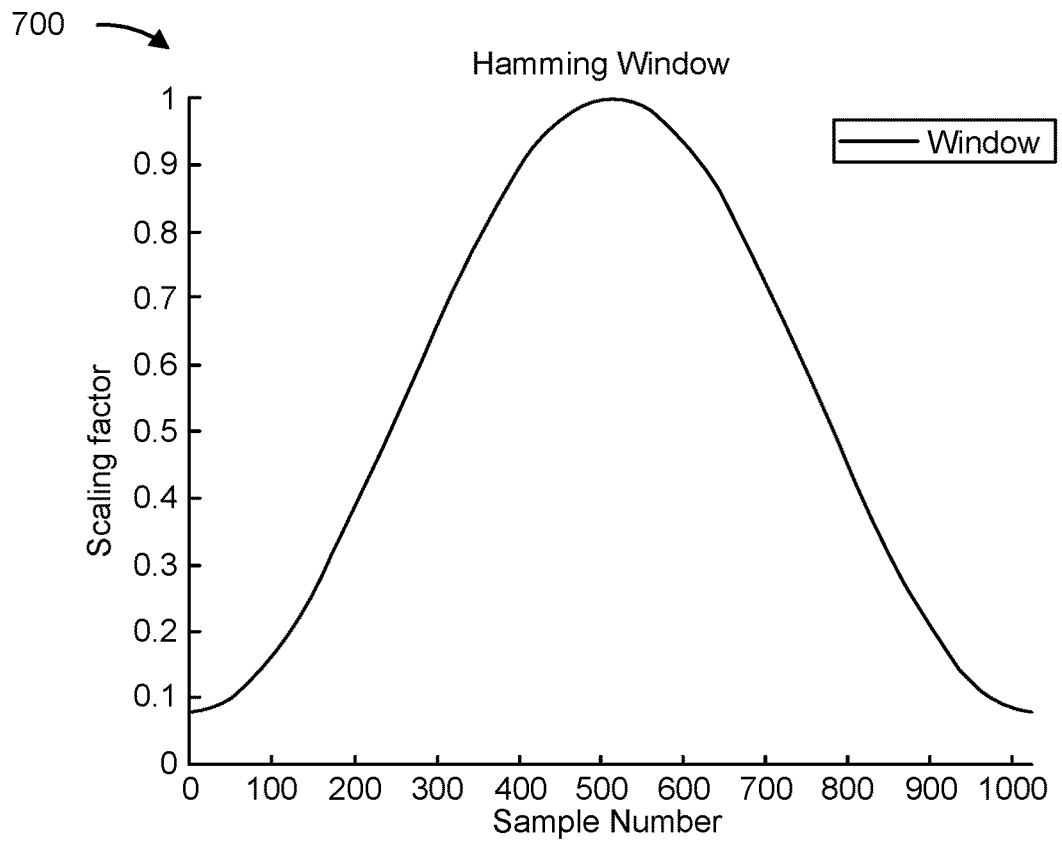
FIG. 7 illustrates example diagrams corresponding to a data compression using a first type of windowing function according to one or more implementations.
Figure 7:
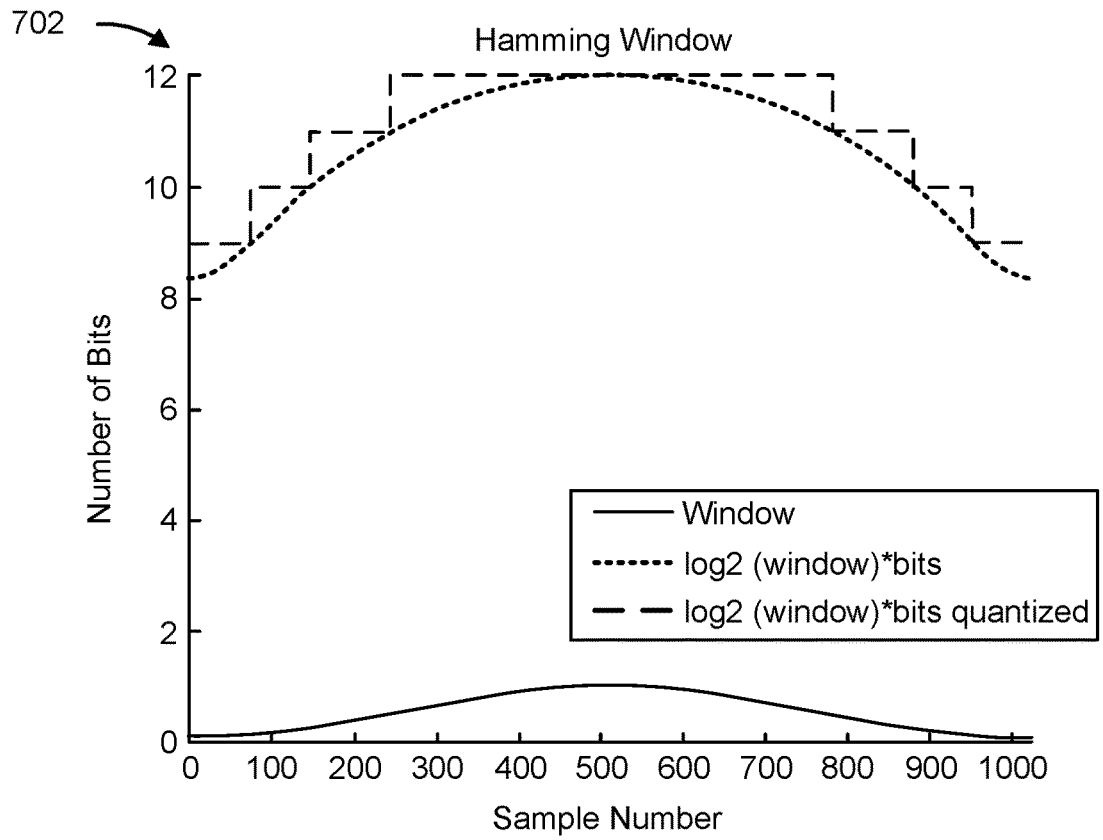

FIG. 7 illustrates example diagrams 700 and 702 corresponding to a data compression using a first type of windowing function according to one or more implementations. The diagram 700 illustrates the first type of windowing function as a Hamming windowing function with a window length spanning 1,024 digital samples. Thus, the predetermined interval of the windowing function may be defined by a number of digital samples generated from a single frequency ramp and input into the windowing function for scaling. The first type of windowing function is a curve that defines scaling factors that vary in the time domain over the predetermined interval of the windowing function. In this example, the Hamming windowing function is a bell-shaped curve comprising an ascending portion and a descending portion that are symmetric about a center of the Hamming windowing function. However, it will be appreciated that a windowing function need not be bell-shaped and/or need not be symmetric about a center of the windowing function. It is also noted that a scaling factor of 1 may be representative of zero-compression factor and a scaling factor of 0 may be representative of a maximum compression factor. Thus, those scaling factors closer to 0 may represent a higher amount of data compression or data decompression to be applied, as compared with those scaling factors closer to 1. As a result, a defined correlation with the windowing function defines an amount of data compression or data decompression applied to a specific radar sample of a frequency ramp.

The diagram 702 illustrates a number of bits (quantized) used to represent specific digital samples over the predetermined interval of the windowing function to generate compressed radar data (e.g., to generate compressed digital words). The number of bits used to represent each digital sample of a single frequency ramp (e.g., a single radar chirp) can be adjusted by the dynamic word length reduction unit 524 or by the dynamic word length reduction unit 622 based on the defined correlation with the windowing function. In this example, the diagram 702 assumes an original word length of 12 bits is used without using decompression. Thus, a word length of 12 bits represents an uncompressed digital sample, whereas a word length of less than 12 bits (e.g., 9 bits, 10 bits, or 11 bits) represents a compressed digital sample. Using a Hamming windowing function in accordance with the implementations described herein provides a reduction in transmitted radar data of approximately 7.5% when compared to transmitting each digital sample with 12 bits.

As indicated above, FIG. 7 is provided as an example. Other examples may differ from what is described with regard to FIG. 7.

Figure 8:
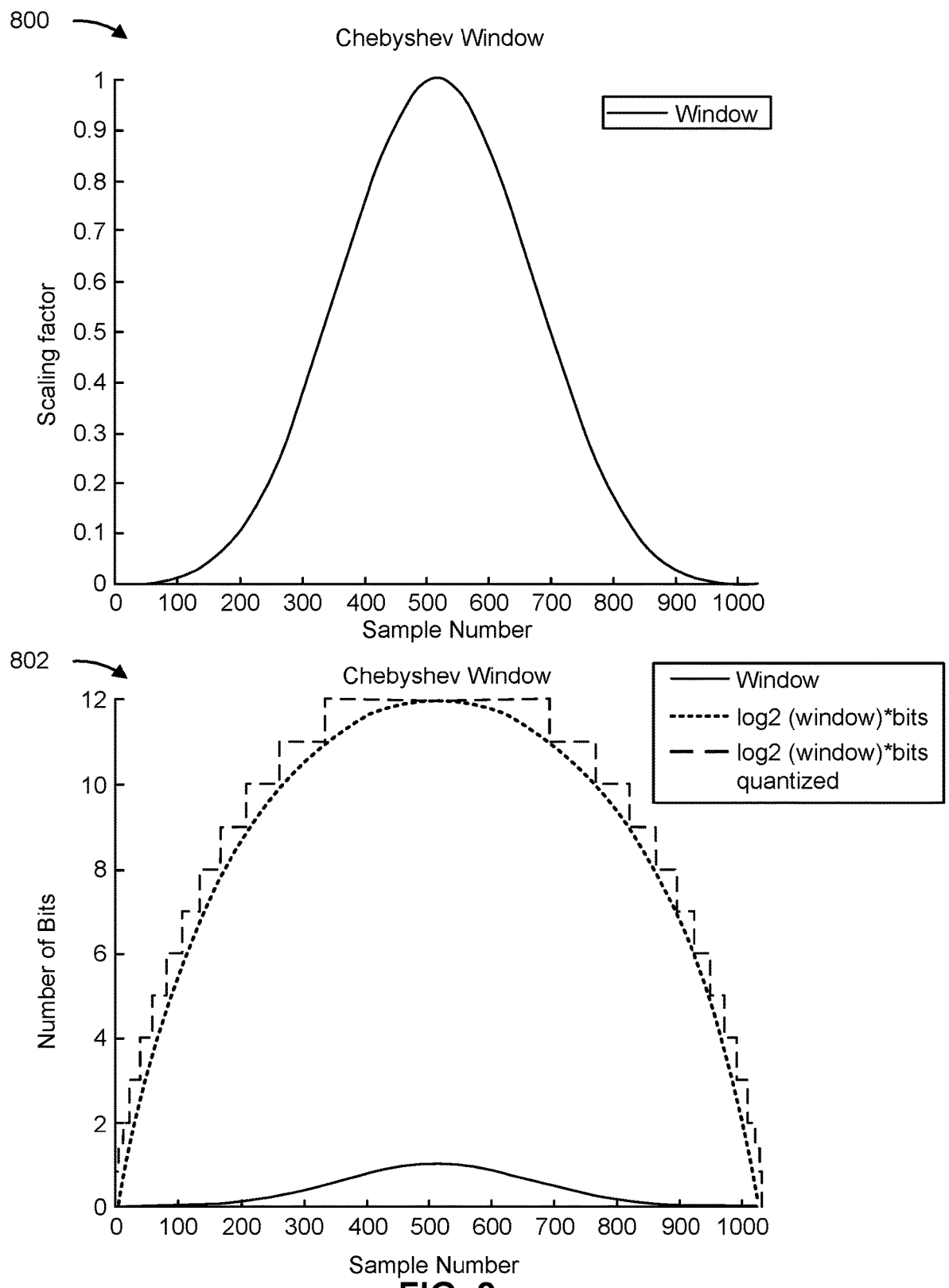
FIG. 8 illustrates example diagrams corresponding to a data compression using a second type of windowing function according to one or more implementations.

FIG. 8 illustrates example diagrams 800 and 802 corresponding to a data compression using a second type of windowing function according to one or more implementations. The diagram 800 illustrates the second type of windowing function as a Chebyshev windowing function with a window length spanning 1,024 digital samples. Thus, the predetermined interval of the windowing function may be defined by a number of digital samples generated from a single frequency ramp and input into the windowing function for scaling. The second type of windowing function is a curve that defines scaling factors that vary in the time domain over the predetermined interval of the windowing function. In this example, the Chebyshev windowing function is a bell-shaped curve comprising an ascending portion and a descending portion that are symmetric about a center of the Chebyshev windowing function. However, it will be appreciated that a windowing function need not be bell-shaped and/or need not be symmetric about a center of the windowing function. It is also noted that a scaling factor of 1 may be representative of zero-compression factor and a scaling factor of 0 may be representative of a maximum compression factor. Thus, those scaling factors closer to 0 may represent a higher amount of data compression or data decompression to be applied, as compared with those scaling factors closer to 1. As a result, a defined correlation with the windowing function defines an amount of data compression or data decompression applied to a specific radar sample of a frequency ramp.

The diagram 802 illustrates a number of bits (quantized) used to represent specific digital samples over the predetermined interval of the windowing function to generate compressed radar data (e.g., to generate compressed digital words). The number of bits used to represent each digital sample of a single frequency ramp (e.g., a single radar chirp) can be adjusted by the dynamic word length reduction unit 524 or by the dynamic word length reduction unit 622 based on the defined correlation with the windowing function. In this example, the diagram 802 assumes an original word length of 12 bits is used without using decompression. Thus, a word length of 12 bits represents an uncompressed digital sample, whereas a word length of less than 12 bits (e.g., 1-11 bits) represents a compressed digital sample. Using a Chebyshev windowing function in accordance with the implementations described provides a reduction in transmitted radar data of approximately 22.7% when compared to transmitting each digital sample with 12 bits.

As indicated above, FIG. 8 is provided as an example. Other examples may differ from what is described with regard to FIG. 8.

Figure 9:
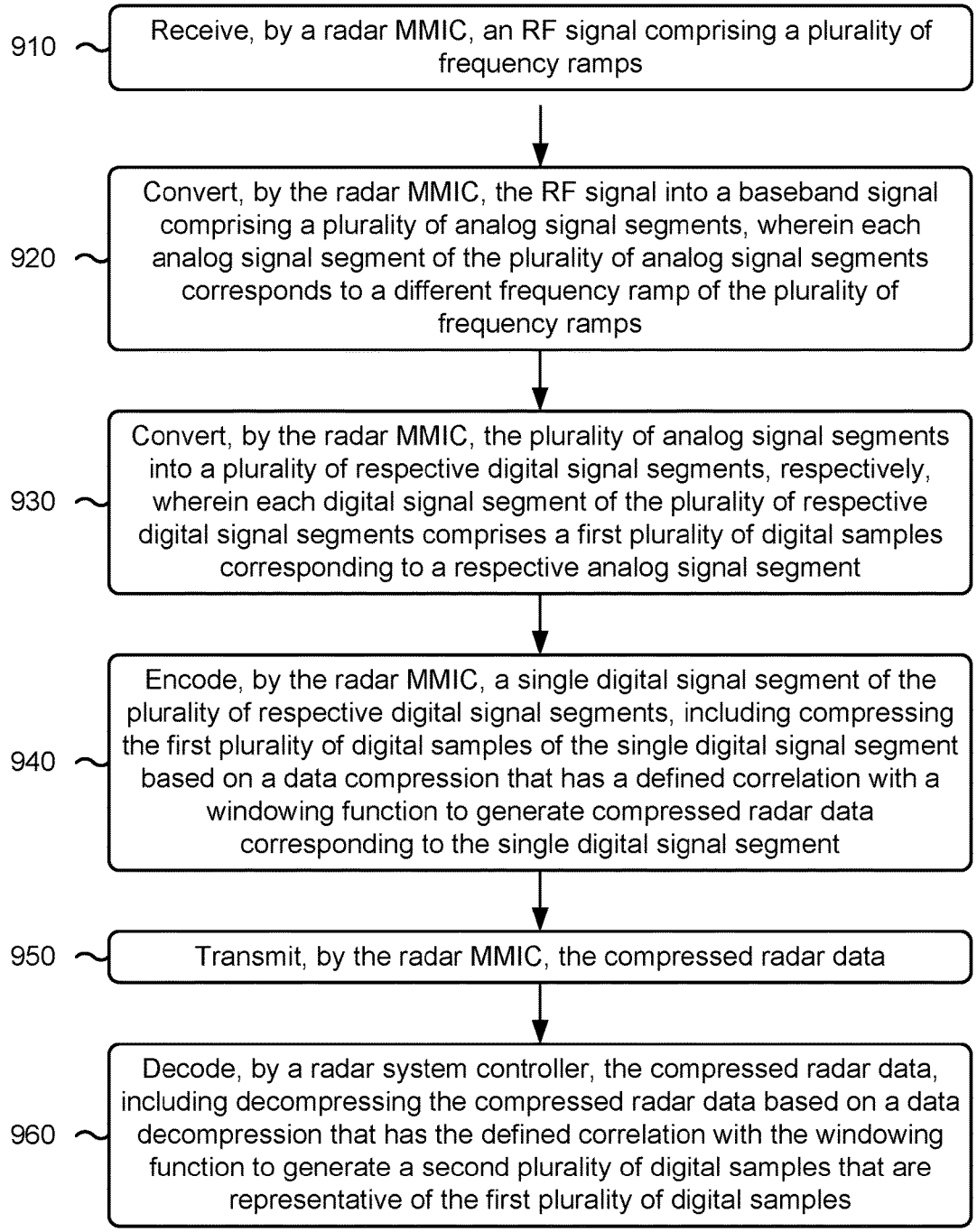
FIG. 9 is a flowchart of an example process associated with radar data compression.

FIG. 9 is a flowchart of an example process 900 associated with radar data compression. In some implementations, one or more process blocks of FIG. 9 are performed by a radar system (e.g., a radar system including the MMIC 502 and controller 504 or a radar system including the MMIC 602 and controller 604). In some implementations, one or more process blocks of FIG. 9 may be performed by one or more components of the radar system, such as front end components, baseband signal processing components, DSP 114, DSP 528, or DSP 626.

As shown in FIG. 9, process 900 may include receiving an RF signal comprising a plurality of frequency ramps (block 910). For example, the radar system (e.g., the radar MMIC of the radar system) may receive the RF signal comprising the plurality of frequency ramps, as described above.

As further shown in FIG. 9, process 900 may include converting the RF signal into a baseband signal comprising a plurality of analog signal segments, wherein each analog signal segment of the plurality of analog signal segments corresponds to a different frequency ramp of the plurality of frequency ramps (block 920). For example, the radar system (e.g., the radar MMIC of the radar system) may convert the RF signal into a baseband signal comprising a plurality of analog signal segments, wherein each analog signal segment of the plurality of analog signal segments corresponds to a different frequency ramp of the plurality of frequency ramps, as described above.

As further shown in FIG. 9, process 900 may include converting the plurality of analog signal segments into a plurality of respective digital signal segments, respectively, wherein each digital signal segment of the plurality of respective digital signal segments comprises a first plurality of digital samples corresponding to a respective analog signal segment (block 930). For example, the radar system (e.g., the radar MMIC of the radar system) may convert the plurality of analog signal segments into a plurality of respective digital signal segments, respectively, wherein each digital signal segment of the plurality of respective digital signal segments comprises a first plurality of digital samples corresponding to a respective analog signal segment, as described above.

As further shown in FIG. 9, process 900 may include encoding a single digital signal segment of the plurality of respective digital signal segments, including compressing the first plurality of digital samples of the single digital signal segment based on a data compression that has a defined correlation with a windowing function to generate compressed radar data corresponding to the single digital signal segment (block 940). For example, the radar system (e.g., the radar MMIC of the radar system) may encode a single digital signal segment of the plurality of respective digital signal segments, including compressing the first plurality of digital samples of the single digital signal segment based on a data compression that has a defined correlation with a windowing function to generate compressed radar data corresponding to the single digital signal segment, as described above.

As further shown in FIG. 9, process 900 may include transmitting the compressed radar data (block 950). For example, the radar system (e.g., the radar MMIC of the radar system) may transmit the compressed radar data, as described above.

As further shown in FIG. 9, process 900 may include decoding the compressed radar data, including decompressing the compressed radar data based on a data decompression that has the defined correlation with the windowing function to generate a second plurality of digital samples that are representative of the first plurality of digital samples (block 960). For example, the radar system (e.g., the radar system controller) may decode the compressed radar data, including decompressing the compressed radar data based on a data decompression that has the defined correlation with the windowing function to generate a second plurality of digital samples that are representative of the first plurality of digital samples, as described above.

Process 900 may include additional implementations, such as any single implementation or any combination of implementations described below and/or in connection with one or more other processes described elsewhere herein.

In some implementations, the compressed radar data comprises a first plurality of digital words having a plurality of reduced word lengths, wherein each digital word of the first plurality of digital words corresponds to a different digital sample of the first plurality of digital samples, wherein decompressing the compressed radar data includes applying a dynamic word length expansion to the first plurality of digital words according to the defined correlation with the windowing function to generate a second plurality of digital words, wherein each digital word of the second plurality of digital words has a same number of bits corresponding to an expanded word length, and wherein the second plurality of digital words correspond to the second plurality of digital samples, respectively.

Although FIG. 9 shows example blocks of process 900, in some implementations, process 900 includes additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A radar monolithic microwave integrated circuit (MMIC), comprising: a radio frequency (RF) input configured to receive an RF signal comprising a plurality of frequency ramps; a baseband processing circuit configured to convert the RF signal into a baseband signal comprising a plurality of analog signal segments, wherein each analog signal segment of the plurality of analog signal segments corresponds to a different frequency ramp of the plurality of frequency ramps; an analog-to-digital converter (ADC) configured to convert the plurality of analog signal segments into a plurality of respective digital signal segments, wherein each digital signal segment of the plurality of respective digital signal segments comprises a plurality of digital samples corresponding to a respective analog signal segment; an encoder configured to receive a single digital signal segment of the plurality of respective digital signal segments and compress the plurality of digital samples of the single digital signal segment based on a data compression that has a defined correlation with a windowing function to generate compressed radar data corresponding to the single digital signal segment; and a data transmission interface configured to transmit the compressed radar data.

Aspect 2: The radar MMIC of Aspect 1, wherein the defined correlation with the windowing function is a curve comprising at least an ascending portion and a descending portion, and the encoder is configured to compress the plurality of digital samples of the single digital signal segment according to the curve.

Aspect 3: The radar MMIC of any of Aspects 1-2, wherein the data compression is an inhomogeneous data compression, and wherein the encoder is configured to apply the inhomogeneous data compression to the plurality of digital samples of the single digital signal segment such that an amount of compression applied to the plurality of digital samples of the single digital signal segment varies across the plurality of digital samples of the single digital signal segment in a time domain according to the defined correlation with the windowing function.

Aspect 4: The radar MMIC of any of Aspects 1-3, wherein the encoder is configured to apply the data compression to the plurality of digital samples of the single digital signal segment based on a plurality of scaling factors that correspond to the defined correlation with the windowing function, wherein the encoder is configured to apply the data compression to a first digital sample subset of the plurality of digital samples based on a first scaling factor of the plurality of scaling factors, wherein the encoder is configured to apply the data compression to a second digital sample subset of the plurality of digital samples based on a second scaling factor of the plurality of scaling factors that is different from the first scaling factor, wherein the encoder is configured to apply the data compression to a third digital sample subset of the plurality of digital samples based on a third scaling factor of the plurality of scaling factors, wherein the third scaling factor is different from the second scaling factor, and wherein the second digital sample subset is between the first digital sample subset and the third digital sample subset in a time domain.

Aspect 5: The radar MMIC of Aspect 4, wherein the first scaling factor and the third scaling factor are less than 1, such that the first digital sample subset is compressed according to the first scaling factor and the third digital sample subset is compressed according to the third scaling factor, and wherein the second scaling factor is 1, such that the second digital sample subset is not compressed.

Aspect 6: The radar MMIC of Aspect 4, wherein the first scaling factor and the third scaling factor are equal and are less than 1, such that the first digital sample subset and the third digital sample subset are compressed by a first amount corresponding to the first scaling factor and the third scaling factor, and wherein the second scaling factor is less than 1, such that the second digital sample subset is compressed by a second amount corresponding to the second scaling factor.

Aspect 7: The radar MMIC of any of Aspects 1-6, wherein the compressed radar data comprises a plurality of digital words corresponding to the plurality of digital samples of the single digital signal segment, respectively, and wherein the data compression is a lossless compression that includes scaling the plurality of digital samples of the single digital signal segment with the windowing function to generate scaled digital samples and removing most significant bits (MSBs) from the scaled digital samples according to the defined correlation with the windowing function to generate the plurality of digital words.

Aspect 8: The radar MMIC of any of Aspects 1-7, wherein the compressed radar data comprises a plurality of digital words corresponding to the plurality of digital samples of the single digital signal segment, respectively, and wherein the data compression is a lossy compression that includes removing least significant bits (LSBs) from the plurality of digital samples of the single digital signal segment according to the defined correlation with the windowing function to generate the plurality of digital words.

Aspect 9: The radar MMIC of any of Aspects 1-8, wherein the encoder is configured to apply the windowing function to the plurality of digital samples of the single digital signal segment to generate a plurality of respective scaled sample values for the plurality of digital samples of the single digital signal segment, and wherein the encoder is configured to apply a dynamic word length reduction to the plurality of respective scaled sample values according to the defined correlation with the windowing function to generate a plurality of digital words corresponding to the plurality of respective scaled sample values, respectively, and wherein the plurality of digital words have a plurality of reduced word lengths.

Aspect 10: The radar MMIC of Aspect 9, wherein the encoder is configured to apply the dynamic word length reduction to the plurality of respective scaled sample values by omitting most significant bits (MSBs) in the plurality of digital words according to the defined correlation with the windowing function to generate the plurality of digital words that have the plurality of reduced word lengths.

Aspect 11: The radar MMIC of Aspect 9, wherein a number of bits of each digital word of the plurality of digital words is scaled according to the defined correlation with the windowing function.

Aspect 12: The radar MMIC of any of Aspects 1-11, wherein the encoder is configured to apply a dynamic word length reduction to the plurality of digital samples according to the defined correlation with the windowing function to generate a plurality of digital words corresponding to the plurality of digital samples, respectively, and wherein the plurality of digital words have a plurality of reduced word lengths.

Aspect 13: The radar MMIC of Aspect 12, wherein the encoder is configured to apply the dynamic word length reduction to the plurality of digital samples, including removing least significant bits (LSBs) in the plurality of digital words according to the defined correlation with the windowing function to generate the plurality of digital words that have the plurality of reduced word lengths.

Aspect 14: The radar MMIC of Aspect 12, wherein a number of bits of each digital word of the plurality of digital words is scaled according to the defined correlation with the windowing function.

Aspect 15: A data transmission method, comprising: receiving, by a radar monolithic microwave integrated circuit (MMIC), a radio frequency (RF) signal comprising a plurality of frequency ramps; converting, by the radar MMIC, the RF signal into a baseband signal comprising a plurality of analog signal segments, wherein each analog signal segment of the plurality of analog signal segments corresponds to a different frequency ramp of the plurality of frequency ramps; converting, by the radar MMIC, the plurality of analog signal segments into a plurality of respective digital signal segments, respectively, wherein each digital signal segment of the plurality of respective digital signal segments comprises a first plurality of digital samples corresponding to a respective analog signal segment; encoding, by the radar MMIC, a single digital signal segment of the plurality of respective digital signal segments, including compressing the first plurality of digital samples of the single digital signal segment based on a data compression that has a defined correlation with a windowing function to generate compressed radar data corresponding to the single digital signal segment; transmitting, by the radar MMIC, the compressed radar data; and decoding, by a radar system controller, the compressed radar data, including decompressing the compressed radar data based on a data decompression that has the defined correlation with the windowing function to generate a second plurality of digital samples that are representative of the first plurality of digital samples.

Aspect 16: The method of Aspect 15, wherein the compressed radar data comprises a first plurality of digital words having a plurality of reduced word lengths, wherein each digital word of the first plurality of digital words corresponds to a different digital sample of the first plurality of digital samples, wherein decompressing the compressed radar data includes applying a dynamic word length expansion to the first plurality of digital words according to the defined correlation with the windowing function to generate a second plurality of digital words, wherein each digital word of the second plurality of digital words has a same number of bits corresponding to an expanded word length, and wherein the second plurality of digital words correspond to the second plurality of digital samples, respectively.

Aspect 17: A radar system controller, comprising: a data transmission interface configured to receive compressed radar data comprising a first plurality of digital words having a first plurality of word lengths; and a decoder configured to decompress the first plurality of digital words by applying a dynamic word length expansion to the first plurality of digital words according to a defined correlation with a windowing function to generate a second plurality of digital words, wherein each digital word of the second plurality of digital words has a same number of bits corresponding to an expanded word length.

Aspect 18: The radar system controller of Aspect 17, wherein the second plurality of digital words correspond to a single frequency ramp of a radio frequency (RF) signal, and wherein the radar system controller further comprises: a signal processor configured to apply a discrete Fourier transform (DFT) to the second plurality of digital words to generate a range-DFT.

Aspect 19: The radar system controller of any of Aspects 17-18, further comprising: a signal processor configured to apply the windowing function to the second plurality of digital words to generate a plurality of digital samples and apply a discrete Fourier transform (DFT) to the plurality of digital samples to generate a range-DFT.

Aspect 20: A system configured to perform one or more operations recited in one or more of Aspects 1-19.

Aspect 21: An apparatus comprising means for performing one or more operations recited in one or more of Aspects 1-19.

Aspect 22: A non-transitory computer-readable medium storing a set of instructions, the set of instructions comprising one or more instructions that, when executed by a device, cause the device to perform one or more operations recited in one or more of Aspects 1-19.

Aspect 23: A computer program product comprising instructions or code for executing one or more operations recited in one or more of Aspects 1-19.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A radar monolithic microwave integrated circuit (MMIC), comprising:
    a radio frequency (RF) input configured to receive an RF signal comprising a plurality of frequency ramps;
    a baseband processing circuit configured to convert the RF signal into a baseband signal comprising a plurality of analog signal segments, wherein each analog signal segment of the plurality of analog signal segments corresponds to a different frequency ramp of the plurality of frequency ramps;
    an analog-to-digital converter (ADC) configured to convert the plurality of analog signal segments into a plurality of respective digital signal segments, wherein each digital signal segment of the plurality of respective digital signal segments comprises a plurality of digital samples corresponding to a respective analog signal segment;
    an encoder configured to receive a single digital signal segment of the plurality of respective digital signal segments and compress the plurality of digital samples of the single digital signal segment based on a data compression that has a defined correlation with a windowing function to generate compressed radar data corresponding to the single digital signal segment; and
    a data transmission interface configured to transmit the compressed radar data.

2. The radar MMIC of claim 1, wherein the defined correlation with the windowing function is a curve comprising at least an ascending portion and a descending portion, and the encoder is configured to compress the plurality of digital samples of the single digital signal segment according to the curve.

3. The radar MMIC of claim 1, wherein the data compression is an inhomogeneous data compression, and
    wherein the encoder is configured to apply the inhomogeneous data compression to the plurality of digital samples of the single digital signal segment such that an amount of compression applied to the plurality of digital samples of the single digital signal segment varies across the plurality of digital samples of the single digital signal segment in a time domain according to the defined correlation with the windowing function.

4. The radar MMIC of claim 1, wherein the encoder is configured to apply the data compression to the plurality of digital samples of the single digital signal segment based on a plurality of scaling factors that correspond to the defined correlation with the windowing function,
    wherein the encoder is configured to apply the data compression to a first digital sample subset of the plurality of digital samples based on a first scaling factor of the plurality of scaling factors,
    wherein the encoder is configured to apply the data compression to a second digital sample subset of the plurality of digital samples based on a second scaling factor of the plurality of scaling factors that is different from the first scaling factor,
    wherein the encoder is configured to apply the data compression to a third digital sample subset of the plurality of digital samples based on a third scaling factor of the plurality of scaling factors, wherein the third scaling factor is different from the second scaling factor, and
    wherein the second digital sample subset is between the first digital sample subset and the third digital sample subset in a time domain.

5. The radar MMIC of claim 4, wherein the first scaling factor and the third scaling factor are less than 1, such that the first digital sample subset is compressed according to the first scaling factor and the third digital sample subset is compressed according to the third scaling factor, and
    wherein the second scaling factor is 1, such that the second digital sample subset is not compressed.

6. The radar MMIC of claim 4, wherein the first scaling factor and the third scaling factor are equal and are less than 1, such that the first digital sample subset and the third digital sample subset are compressed by a first amount corresponding to the first scaling factor and the third scaling factor, and
    wherein the second scaling factor is less than 1, such that the second digital sample subset is compressed by a second amount corresponding to the second scaling factor.

7. The radar MMIC of claim 1, wherein the compressed radar data comprises a plurality of digital words corresponding to the plurality of digital samples of the single digital signal segment, respectively, and
    wherein the data compression is a lossless compression that includes scaling the plurality of digital samples of the single digital signal segment with the windowing function to generate scaled digital samples and removing most significant bits (MSBs) from the scaled digital samples according to the defined correlation with the windowing function to generate the plurality of digital words.

8. The radar MMIC of claim 1, wherein the compressed radar data comprises a plurality of digital words corresponding to the plurality of digital samples of the single digital signal segment, respectively, and
    wherein the data compression is a lossy compression that includes removing least significant bits (LSBs) from the plurality of digital samples of the single digital signal segment according to the defined correlation with the windowing function to generate the plurality of digital words.

9. The radar MMIC of claim 1, wherein the encoder is configured to apply the windowing function to the plurality of digital samples of the single digital signal segment to generate a plurality of respective scaled sample values for the plurality of digital samples of the single digital signal segment, and
    wherein the encoder is configured to apply a dynamic word length reduction to the plurality of respective scaled sample values according to the defined correlation with the windowing function to generate a plurality of digital words corresponding to the plurality of respective scaled sample values, respectively, and wherein the plurality of digital words have a plurality of reduced word lengths.

10. The radar MMIC of claim 9, wherein the encoder is configured to apply the dynamic word length reduction to the plurality of respective scaled sample values by omitting most significant bits (MSBs) in the plurality of digital words according to the defined correlation with the windowing function to generate the plurality of digital words that have the plurality of reduced word lengths.

11. The radar MMIC of claim 9, wherein a number of bits of each digital word of the plurality of digital words is scaled according to the defined correlation with the windowing function.

12. The radar MMIC of claim 1, wherein the encoder is configured to apply a dynamic word length reduction to the plurality of digital samples according to the defined correlation with the windowing function to generate a plurality of digital words corresponding to the plurality of digital samples, respectively, and wherein the plurality of digital words have a plurality of reduced word lengths.

13. The radar MMIC of claim 12, wherein the encoder is configured to apply the dynamic word length reduction to the plurality of digital samples, including removing least significant bits (LSBs) in the plurality of digital words according to the defined correlation with the windowing function to generate the plurality of digital words that have the plurality of reduced word lengths.

14. The radar MMIC of claim 12, wherein a number of bits of each digital word of the plurality of digital words is scaled according to the defined correlation with the windowing function.

15. A method for data transmission, comprising:
receiving, by a radar monolithic microwave integrated circuit (MMIC), a radio frequency (RF) signal comprising a plurality of frequency ramps;
converting, by the radar MMIC, the RF signal into a baseband signal comprising a plurality of analog signal segments, wherein each analog signal segment of the plurality of analog signal segments corresponds to a different frequency ramp of the plurality of frequency ramps;
converting, by the radar MMIC, the plurality of analog signal segments into a plurality of respective digital signal segments, respectively, wherein each digital signal segment of the plurality of respective digital signal segments comprises a first plurality of digital samples corresponding to a respective analog signal segment;
encoding, by the radar MMIC, a single digital signal segment of the plurality of respective digital signal segments, including compressing the first plurality of digital samples of the single digital signal segment based on a data compression that has a defined correlation with a windowing function to generate compressed radar data corresponding to the single digital signal segment;
transmitting, by the radar MMIC, the compressed radar data; and
decoding, by a radar system controller, the compressed radar data, including decompressing the compressed radar data based on a data decompression that has the defined correlation with the windowing function to generate a second plurality of digital samples that are representative of the first plurality of digital samples.

16. The method of claim 15, wherein the compressed radar data comprises a first plurality of digital words having a plurality of reduced word lengths,
wherein each digital word of the first plurality of digital words corresponds to a different digital sample of the first plurality of digital samples,
wherein decompressing the compressed radar data includes applying a dynamic word length expansion to the first plurality of digital words according to the defined correlation with the windowing function to generate a second plurality of digital words, wherein each digital word of the second plurality of digital words has a same number of bits corresponding to an expanded word length, and
wherein the second plurality of digital words correspond to the second plurality of digital samples, respectively.

17. A radar system controller, comprising:
a data transmission interface configured to receive compressed radar data comprising a first plurality of digital words having a first plurality of word lengths; and
a decoder configured to decompress the first plurality of digital words by applying a dynamic word length expansion to the first plurality of digital words according to a defined correlation with a windowing function to generate a second plurality of digital words, wherein each digital word of the second plurality of digital words has a same number of bits corresponding to an expanded word length.

18. The radar system controller of claim 17, wherein the second plurality of digital words correspond to a single frequency ramp of a radio frequency (RF) signal, and
wherein the radar system controller further comprises:
a signal processor configured to apply a discrete Fourier transform (DFT) to the second plurality of digital words to generate a range-DFT.

19. The radar system controller of claim 17, further comprising:
a signal processor configured to apply the windowing function to the second plurality of digital words to generate a plurality of digital samples and apply a discrete Fourier transform (DFT) to the plurality of digital samples to generate a range-DFT.

* * * * *